(12) United States Patent
Radel et al.

(10) Patent No.: US 11,508,257 B2
(45) Date of Patent: Nov. 22, 2022

(54) METHOD TO CONTROL A VIRTUAL IMAGE IN A DISPLAY

(71) Applicant: 8259402 CANADA INC., Dorval (CA)

(72) Inventors: Jason Carl Radel, Montreal (CA); Fernando Petruzziello, Montreal (CA)

(73) Assignee: 8259402 CANADA INC., Dorval (CA)

( * ) Notice: Subject to any disclaimer, the term of this patent is extended or adjusted under 35 U.S.C. 154(b) by 0 days.

(21) Appl. No.: 16/487,573

(22) PCT Filed: Mar. 6, 2018

(86) PCT No.: PCT/CA2018/050266
§ 371 (c)(1),
(2) Date: Aug. 21, 2019

(87) PCT Pub. No.: WO2018/161163
PCT Pub. Date: Sep. 13, 2018

(65) Prior Publication Data
US 2020/0057311 A1    Feb. 20, 2020

Related U.S. Application Data

(60) Provisional application No. 62/514,194, filed on Jun. 2, 2017, provisional application No. 62/467,846, filed on Mar. 7, 2017.

(51) Int. Cl.
*G02B 30/35* (2020.01)
*G02B 5/10* (2006.01)
(Continued)

(52) U.S. Cl.
CPC .............. *G09B 9/32* (2013.01); *G02B 5/10* (2013.01); *G02B 27/0101* (2013.01);
(Continued)

(58) Field of Classification Search
CPC ............ G02B 27/0101; G02B 27/0172; G02B 2027/011; G02B 2027/014;
(Continued)

(56) References Cited

U.S. PATENT DOCUMENTS 5,170,153 A   12/1992   Migozzi et al.
5,253,116 A   10/1993   Lacroix
(Continued)

FOREIGN PATENT DOCUMENTS

CN    105044912    11/2015
WO    2016112128    7/2016

OTHER PUBLICATIONS

Extended European seacrh report; 8 pages, David Hanon, dated Nov. 3, 2020.

*Primary Examiner* — Dismery Mercedes
(74) *Attorney, Agent, or Firm* — Benoit & Cote Inc.; Charles-André Caron

(57) ABSTRACT

There is described a method for controlling, in a display, a virtual image of a displaying object for which displaying is controllable. The method comprises providing a curved mirrored surface opposing the displaying object to produce the virtual image. The location of an observer is determined, with respect to the curved mirrored surface. A position of the virtual image can then be determined for the observer at the location, wherein this virtual image provides at least one of parallax and a stereoscopic depth cue. The displaying object is controlled to produce the virtual image as determined.

6 Claims, 19 Drawing Sheets

(51) Int. Cl.

| | |
|---|---|
| *G02B 27/01* | (2006.01) |
| *G09G 3/00* | (2006.01) |
| *H04N 13/10* | (2018.01) |
| *G09B 9/32* | (2006.01) |
| *H04N 13/117* | (2018.01) |
| *G06T 19/00* | (2011.01) |
| *G06F 3/01* | (2006.01) |
| *H04N 13/128* | (2018.01) |

(52) U.S. Cl.
CPC ......... *G02B 27/0172* (2013.01); *G02B 30/35* (2020.01); *G06F 3/011* (2013.01); *G06T 19/006* (2013.01); *G09G 3/003* (2013.01); *H04N 13/10* (2018.05); *H04N 13/117* (2018.05); *H04N 13/128* (2018.05); *G02B 2027/0185* (2013.01); *G09G 2320/0261* (2013.01); *G09G 2340/0464* (2013.01); *G09G 2354/00* (2013.01); *G09G 2380/12* (2013.01)

(58) Field of Classification Search
CPC ...... G02B 2027/0127; G02B 2027/013; G02B 2027/0134; G02B 2027/0185; G02B 30/26; G02B 5/10; G02B 27/017; G02B 2027/0178; G02B 30/35; G02B 27/0093; G02B 27/0185; G09G 2354/00; G06T 19/006; G06T 19/20; G06T 13/40; G06T 7/593; H04N 13/204; H04N 13/128; H04N 2013/0081
See application file for complete search history.

(56) References Cited

U.S. PATENT DOCUMENTS

| | | | |
|---|---|---|---|
| 6,042,238 A | 3/2000 | Blackham et al. | |
| 6,768,585 B2 | 7/2004 | Agostinelli et al. | |
| 7,226,167 B2 | 6/2007 | Cobb | |
| 7,663,793 B1 | 2/2010 | Doucet | |
| 8,149,508 B2 | 4/2012 | Ferren et al. | |
| 8,179,424 B2* | 5/2012 | Moller | H04N 13/363 348/46 |
| 9,202,313 B2* | 12/2015 | Bennet | G06F 3/0304 |
| 9,311,883 B2* | 4/2016 | Cajigas | G09G 5/00 |
| 9,767,606 B2* | 9/2017 | Kapinos | G06T 15/20 |
| 9,927,948 B2* | 3/2018 | Tsukahara | G06F 3/04817 |
| 10,223,835 B2* | 3/2019 | Cashen | G02B 27/0101 |
| 10,257,492 B2* | 4/2019 | Raghoebardajal | H04N 13/189 |
| 10,306,214 B2* | 5/2019 | Ohashi | G09G 5/00 |
| 10,349,031 B2* | 7/2019 | DeLuca | G06F 3/013 |
| 10,373,371 B2* | 8/2019 | Zeng | B29C 64/386 |
| 2002/0186348 A1 | 12/2002 | Covannon et al. | |
| 2004/0017546 A1 | 1/2004 | Agostinelli | |
| 2004/0212882 A1* | 10/2004 | Liang | G02B 30/26 359/462 |
| 2005/0264761 A1 | 12/2005 | Cobb | |
| 2010/0097304 A1 | 4/2010 | Vidal et al. | |
| 2011/0205633 A1* | 8/2011 | Suzuki | G02B 27/0101 359/872 |
| 2011/0304708 A1* | 12/2011 | Ignatov | H04N 13/128 348/51 |
| 2013/0050186 A1 | 2/2013 | Large | |
| 2014/0313580 A1 | 10/2014 | Hollander et al. | |
| 2015/0097865 A1* | 4/2015 | Subramanian | G06T 11/60 345/633 |
| 2016/0012643 A1* | 1/2016 | Kezele | H04N 13/156 345/633 |
| 2016/0042567 A1 | 2/2016 | Shuster et al. | |
| 2016/0078685 A1* | 3/2016 | Koga | G06F 3/005 345/633 |
| 2016/0219260 A1* | 7/2016 | Sato | H04N 13/398 |
| 2017/0169612 A1* | 6/2017 | Cashen | G06T 19/20 |
| 2017/0227764 A1* | 8/2017 | Kim | G02B 27/141 |
| 2017/0235138 A1* | 8/2017 | Morohashi | H04N 9/3141 359/631 |
| 2018/0035097 A1* | 2/2018 | Ohishi | G06T 7/194 |
| 2018/0176483 A1* | 6/2018 | Knorr | H04N 5/232125 |
| 2019/0084419 A1* | 3/2019 | Suzuki | B60K 35/00 |

* cited by examiner

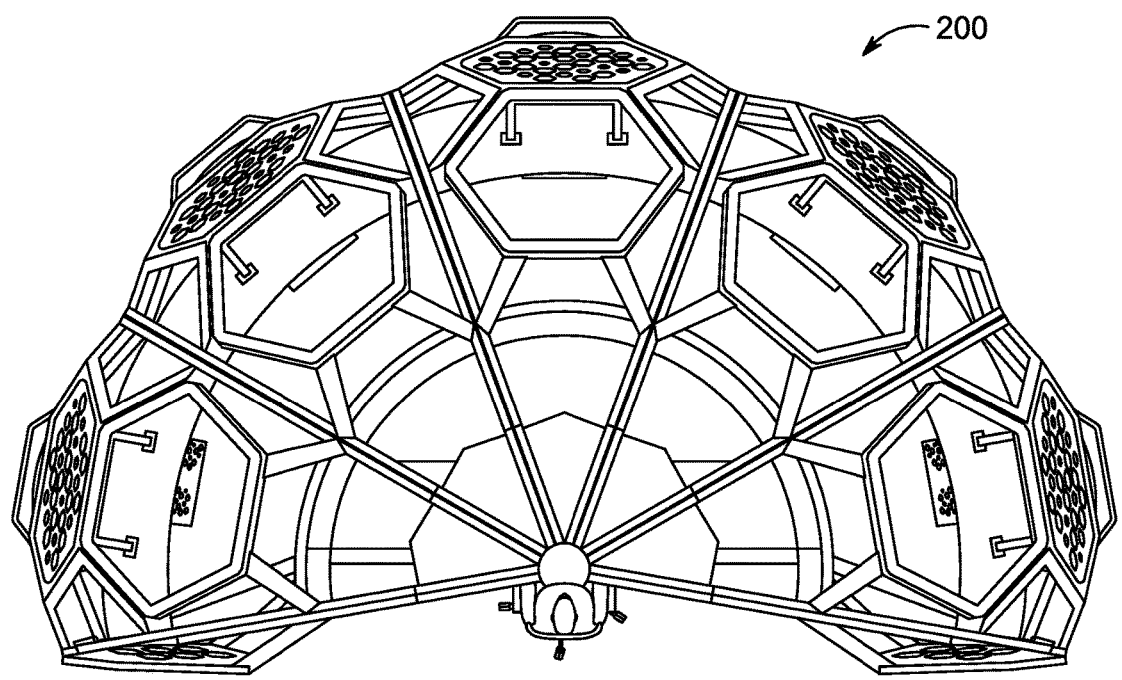
FIGURE 7
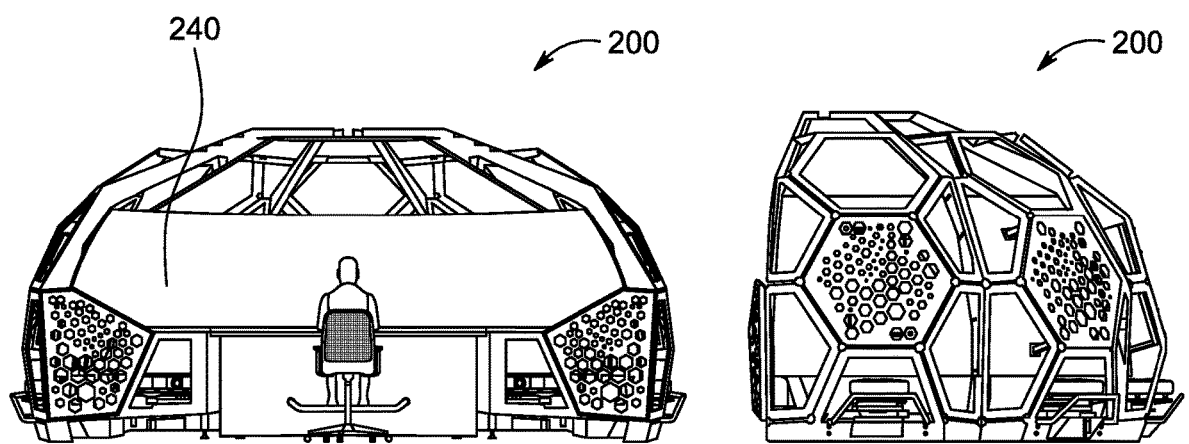
FIGURE 8
FIGURE 9

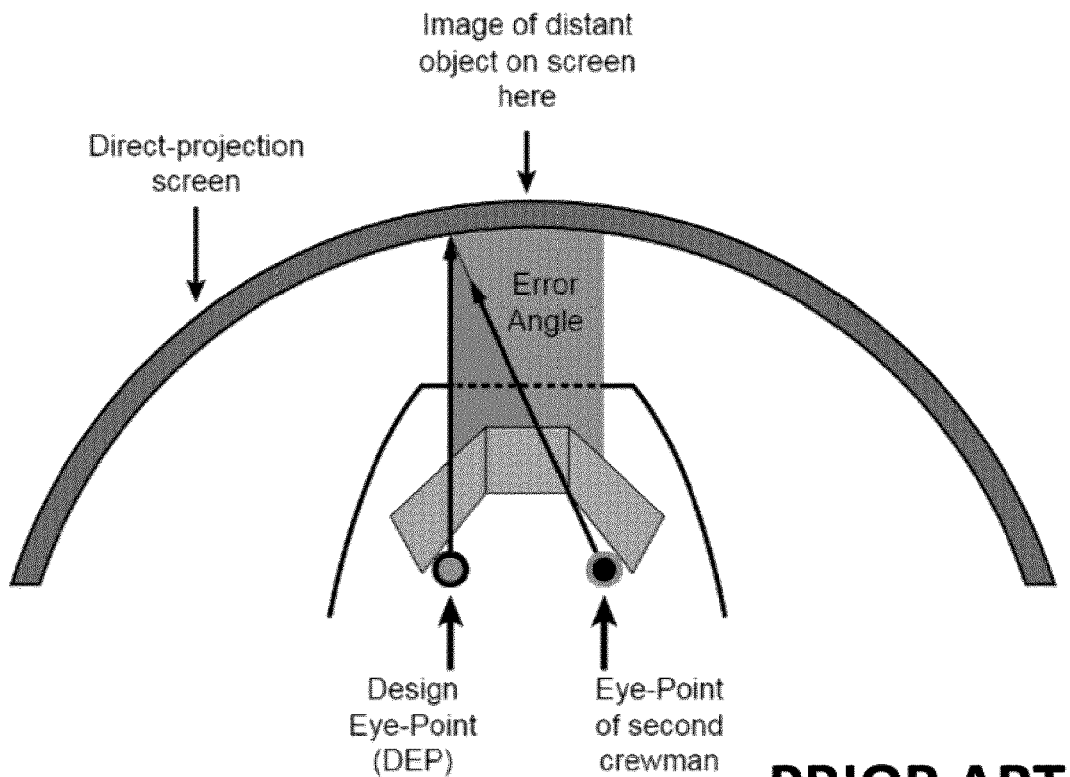
FIGURE 22 PRIOR ART
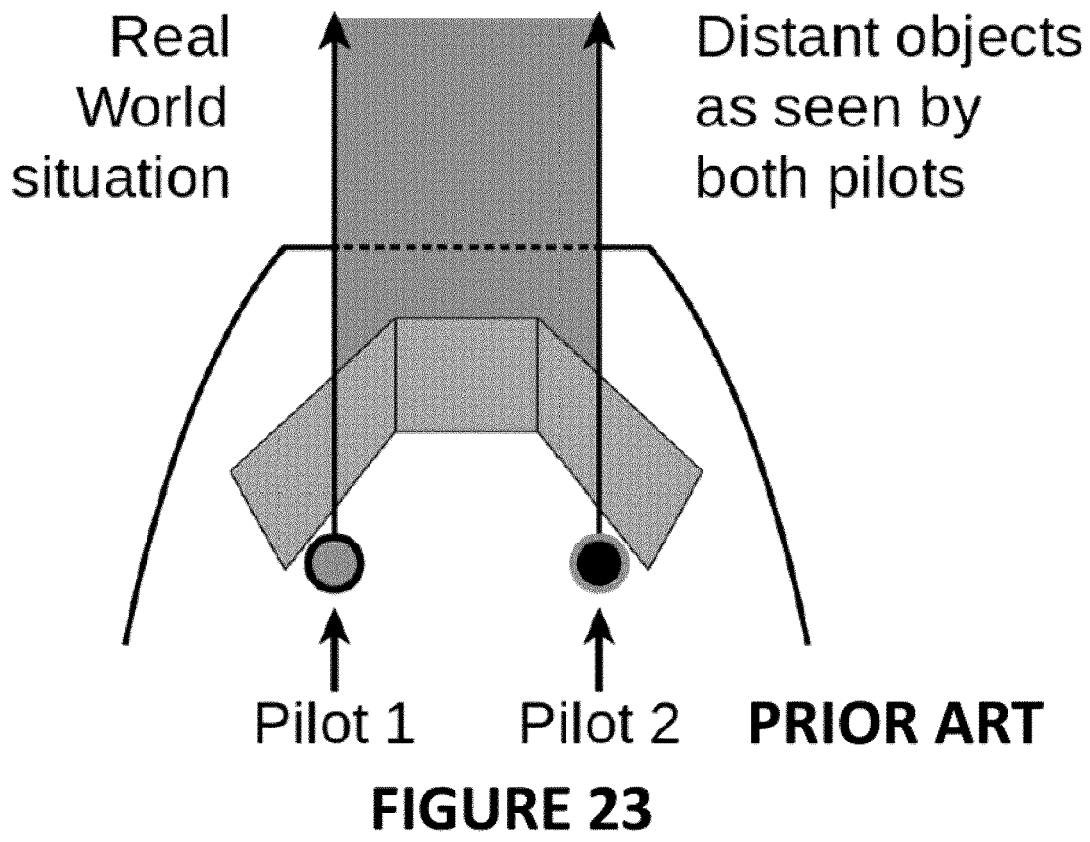
FIGURE 23 PRIOR ART

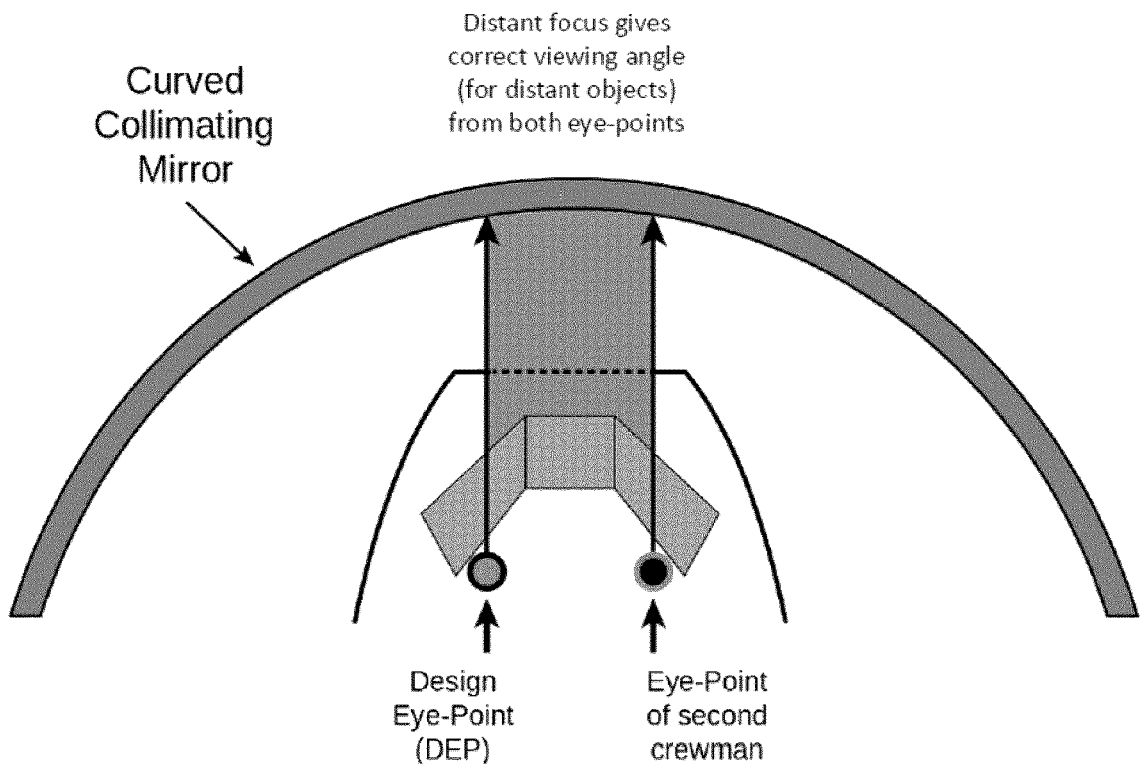
FIGURE 24 PRIOR ART
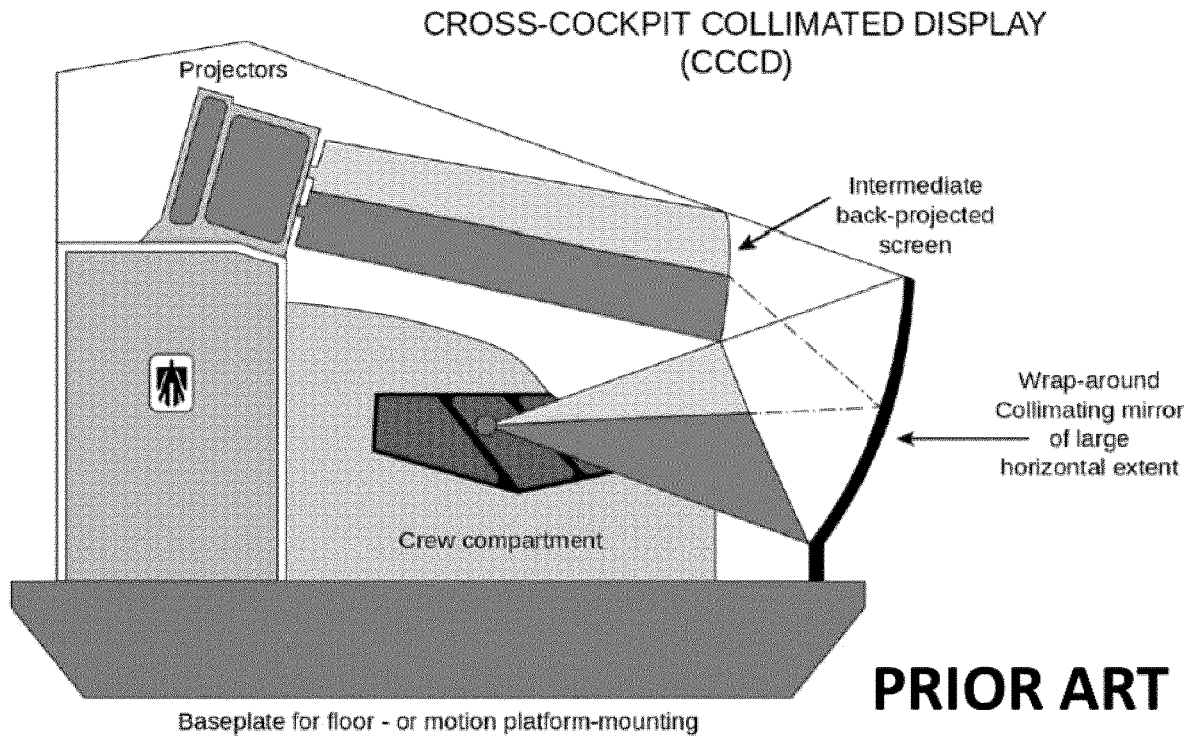
FIGURE 25 PRIOR ART providing a curved mirrored surface opposing the displaying object to produce the virtual image

1910 determining a location of an observer with respect to the curved mirrored surface

1920

Determining:
- a position (or a plurality thereof, forming a shape) of the virtual image for the observer at the location, and/or
- a shape of the curved mirrored surface, and/or
- a shape of the displaying object, which provides at least one of parallax and a stereoscopic depth cue

1930 controlling the displaying object to produce the virtual image as determined

1940

FIGURE 31 determining a shape of a virtual image of an object and/or curved mirrored surface and/or display screen such that when an object is viewed reflecting from the curved mirrored surface which images a display screen, a virtual image of the object is produced, providing at least one of a parallax and a stereoscopic depth cue

2010 providing the curved mirrored surface and the display screen at a distance smaller than the distance that would produce collimated light when reflecting from the curved mirrored surface

2020 displaying the object on a display screen to provide an image rendering that is immersive due to the at least one of the parallax and the stereoscopic depth cue

METHOD TO CONTROL A VIRTUAL IMAGE IN A DISPLAY

CROSS-REFERENCE TO RELATED APPLICATIONS

This application is a US National Phase application under 35 USC § 371 of PCT/CA2018/050266, filed Mar. 6, 2018, which claims priority or benefit of U.S. provisional patent application 62/467,846 filed Mar. 7, 2017 and of U.S. provisional patent application 62/514,194 filed Jun. 2, 2017, the specifications of which are hereby incorporated herein by reference in their entirety.

BACKGROUND

(a) Field

The subject matter disclosed generally relates to mirror optics. More specifically, it relates to the use of mirrored surfaces for display applications.

(b) Related Prior Art

The image of an object formed from the reflection of light rays from a mirrored surface is known as the virtual image of the object. Current standard methods for determining the location of a virtual image for non-planar mirrors or lenses are limited in two ways:
  1) they are based on Gaussian optics, and therefore are only valid when both the observer and the object are near the optical axis of the lens or mirror, and/or
  2) they do not account for the different, conflicting depth cues used by a human observer to infer depth.

The manner by which the generation of virtual images is controlled has an effect on the final result when the display is being used by an observer, especially when the display is used outside of the assumptions on which standard models underlying prior-art displays are based. A method for controlling the display of virtual images in non-planar mirrors such as spherical or parabolic mirrors for viewing angles away from the central axis of the mirror (e.g., 5°, or 10°, 15° or more away from its axis of symmetry) thus needs to be developed for a human observer.

Various display applications, in particular immersive displays, can require mirrors to provide an immersive environment to users. These immersive displays exist in various types.

Head-mounted displays (HMDs) are more widely used to immerse the wearer in virtual reality. By wearing the display in front of the eyes, and by including various optical systems in the display, the user is presented visual content that can adapt to the movement of the user's head, for example. However, the user is required to wear the HMD at all times to enjoy the immersive content, a situation that is not always desirable, especially if the user is to be immersed for long periods, e.g., for training in a flight simulator or for working in an immersive work station.

Virtual reality and augmented reality systems must also be small enough to wear. Consequently, it is hard to incorporate high-resolution and high-quality displays. Virtual reality displays also suffer from the depth cue conflicts such as the vergence-accommodation conflict, i.e., the distance at which a viewer focuses their eyes to see the image clearly is not consistent with the distance they perceive the image via stereoscopic cues. Virtual reality displays also have problems with motion sickness.

Front or rear projection-based display systems provide a simple setting creating an immersive experience for a user. Although relatively simple to install and convenient for many purposes, such as watching movies, these displays suffer from an unrealistic depth sensation, since images are projected onto a screen having a fixed distance to the viewers, and therefore the viewer is not completely immersed into the experience since there is no depth differentiation between objects in the image. In addition, depth cues between objects located outside the projection area and on the projection area are similar, which indicates to the brain that the observer is looking at a flat display located at a similar depth to the objects surrounding this display. These issues can be corrected in part by wearing 3D glasses which render the image stereoscopic, giving a sense of depth to the viewer. This can, however, be uncomfortable (especially for long-time use or for users already wearing glasses) and create a lack of realism since glasses need to be worn to reproduce a reality where no glasses would ordinarily be worn. These displays also suffer from the vergence-accommodation conflict.

Another type of immersive display is the collimated display. Notably, flight simulators use a collimated display to provide an immersive environment. This industry makes use of concave mirrors to produce a virtual image that can be seen by both pilots in the cockpit with the exact same angle. A collimated display is one in which the display facing the user is not a conventional, but rather a reflecting screen (i.e., a convex mirror) on which an image is projected by a reflection on an intermediate display screen. These reflections are used to provide an image, as seen by the user, which is a virtual image created at infinity of the object (i.e., the display screen). The display screen is approximately positioned so that light reflecting from the surface will be nearly collimated after reflecting from the mirror.

The image of an object formed from the reflection of light rays from a mirrored surface is known as the virtual image of the object. Current standard methods for determining the location of a virtual image for non-planar mirrors or lenses are limited in two ways: they are based on Gaussian optics, and hence are only valid when both the observer and object are near the optical axis of the lens or mirror, and/or they do not account for the different, conflicting depth cues used by a human observer to infer depth.

Collimated displays in the simulation industry provide a depth of the virtual image set to be greater than about 60 ft. (about 18.1 m) due to the imaging at "infinity", where the infinity is normally in a range not smaller than 60 ft. This does not allow a proper sense of depth when objects in the content being viewed are supposed to be located at a distance closer than this distance. There is described below a display providing a more immersive environment, taking into account depth cues that the user should see to sense the depth of nearby objects in the environment in which the user is immersed.

SUMMARY OF THE INVENTION

According to a first aspect of the invention, there is provided a method for controlling, in a display, a virtual image of a displaying object for which displaying is controllable, the method comprising:
  providing a curved mirrored surface opposing the displaying object to produce the virtual image;
  determining a location of an observer with respect to the curved mirrored surface; and determining a position of the virtual image for the observer at the location, which provides at least one of parallax and a stereoscopic depth cue;

controlling the displaying object to produce the virtual image as determined.

According to an embodiment, the displaying object is one of a display screen and a display device.

According to an embodiment, the displaying object is a display screen which is one of: a rear projection screen and a front projection screen.

According to an embodiment, controlling the displaying object comprises using a computing system to correct images displayed on the displaying object or by the displaying object to modify a mapping on the displaying object to provide at least one of parallax and a stereoscopic depth cue for the virtual image for the observer at the location.

According to an embodiment, controlling the displaying object comprises obtaining a shape of the curved mirrored surface and a shape of the displaying object to create a virtual image using $$d_o = \frac{d_i R\cos\theta}{R\cos\theta - 2d_i},$$

thereby least one of parallax and a stereoscopic depth cue for the observer at the location.

According to an embodiment, determining a position comprises determining a plurality of positions across a virtual image, thereby forming a shape of the virtual image.

According to an embodiment, determining the position of the virtual image comprises determining the at least one of the parallax and the stereoscopic depth cue for the location of the observer viewing the displaying object through the curved mirrored surface at an angle greater than 5° from an axis of symmetry of the curved mirrored surface.

According to a second aspect of the invention, there is provided a method for controlling, in a display, a virtual image of a displaying object, the method comprising:

determining a shape of a display screen acting as the displaying object on which displaying is controllable;

providing the display screen with the shape as determined, opposing a curved mirrored surface to produce a virtual image of the displaying object;

determining a location of an observer with respect to the curved mirrored surface; and controlling the displaying object by mapping the displaying on the display screen, the shape thereof producing the virtual image as determined which provides at least one of parallax and a stereoscopic depth cue for the observer at the location.

According to an embodiment, the displaying object is a display screen which is one of: a rear projection screen and a front projection screen.

According to an embodiment, controlling the displaying object comprises using a computing system to correct images displayed on the displaying object or by the displaying object, using the shape of the display screen, to modify a mapping on the displaying object to provide at least one of parallax and a stereoscopic depth cue for the virtual image for the observer at the location.

According to an embodiment, controlling the displaying object comprises obtaining a shape of the curved mirrored surface and a mapping of an original image onto the displaying object to create a virtual image using $$d_o = \frac{d_i R\cos\theta}{R\cos\theta - 2d_i},$$

thereby least one of parallax and a stereoscopic depth cue for the observer at the location.

According to an embodiment, producing the virtual image comprises determining the at least one of the parallax and the stereoscopic depth cue for the location of the observer viewing the displaying object through the curved mirrored surface at an angle greater than 5° from an axis of symmetry of the curved mirrored surface.

According to a third aspect of the invention, there is provided a method for controlling, in a display, a virtual image of a displaying object, the method comprising:

determining a shape of a curved mirrored surface;

providing the curved mirrored surface opposing a displaying object on which displaying is controllable to produce the virtual image;

determining a location of an observer with respect to the curved mirrored surface; and controlling the displaying object by mapping the displaying on the display screen to produce the virtual image as determined by the curved mirrored surface having the shape which provides at least one of parallax and a stereoscopic depth cue for the observer at the location.

According to an embodiment, the displaying object is one of a display screen and a display device.

According to an embodiment, the displaying object is a display screen which is one of: a rear projection screen and a front projection screen.

According to an embodiment, controlling the displaying object comprises using a computing system to correct images displayed on the displaying object or by the displaying object, using the shape of the curved mirrored surface, to modify a mapping on the displaying object to provide at least one of parallax and a stereoscopic depth cue for the virtual image for the observer at the location.

According to an embodiment, controlling the displaying object comprises obtaining a shape of the displaying object and a mapping of an original image onto the displaying object to create a virtual image using $$d_o = \frac{d_i R\cos\theta}{R\cos\theta - 2d_i},$$

thereby least one of parallax and a stereoscopic depth cue for the observer at the location.

According to an embodiment, controlling the displaying object comprises determining the at least one of the parallax and the stereoscopic depth cue for the location of the observer viewing the displaying object through the curved mirrored surface at an angle greater than 5° from an axis of symmetry of the curved mirrored surface.

According to a fourth aspect of the invention, there is provided a method for controlling, in a display, a virtual image of a displaying object, the method comprising:

determining a shape of a curved refracting surface;

providing the curved refracting surface opposing a displaying object on which displaying is controllable to produce the virtual image;

determining a location of an observer with respect to the curved refracting surface; and controlling the displaying object by mapping the displaying on the display screen to produce the virtual image as determined by the curved refracting surface having the shape which provides at least one of parallax and a stereoscopic depth cue for the observer at the location when viewed binocularly.

According to an embodiment, the curved refracting surface is a lens.

According to an embodiment, the displaying object is one of a display screen and a display device.

According to an embodiment, the displaying object is a display screen which is one of: a rear projection screen and a front projection screen.

According to an embodiment, controlling the displaying object comprises using a computing system to correct images displayed on the displaying object or by the displaying object, using the shape of the curved refracting surface, to modify a mapping on the displaying object to provide at least one of parallax and a stereoscopic depth cue for the virtual image for the observer at the location.

According to an embodiment, controlling the displaying object comprises obtaining a shape of the displaying object and a mapping of an original image onto the displaying object to create a virtual image using $$d_o = \frac{d_i R\cos\theta}{R\cos\theta - 2d_i},$$

thereby least one of parallax and a stereoscopic depth cue for the observer at the location.

According to an embodiment, controlling the displaying object comprises determining the at least one of the parallax and the stereoscopic depth cue for the location of the observer viewing the displaying object through the curved mirrored surface at an angle greater than 5° from an axis of symmetry of the curved mirrored surface.

According to a fifth aspect of the invention, there is provided a method for operating an immersive display, the method comprising:

providing a curved mirrored surface and a display screen at a distance smaller than a distance that would produce collimated light when reflecting from the curved mirrored surface;

displaying the object on a display screen to provide an image rendering that is immersive due to the at least one of the parallax and the stereoscopic depth cue.

According to an embodiment, the method further comprises determining a virtual image of an object, the virtual image viewed reflecting from a curved mirrored surface which images a display screen, the method comprising determining a position of the virtual image providing at least one of parallax and a stereoscopic depth cue;

According to an embodiment, providing the curved mirrored surface and the display screen at said distance, if the virtual surface is at a distance that is less than 60 ft or 18.288 m, provides a vergence angle between the eyes of the observer greater than 0.2° when the observer views the virtual image.

According to an embodiment, the curved mirrored surface provides a field of view greater than 30° in at least one direction.

According to an embodiment, the method further comprises producing sound at a plurality of locations about the immersive display to make the sound having a source location consistent with the immersive image rendering.

According to an embodiment, the method further comprises providing user controls for interacting with contents of the virtual image.

According to an embodiment, the method further comprises, prior to displaying the object on the display screen, applying an image correction to the object to provide perspective image rendering.

According to an embodiment, displaying the object on the display screen comprises determining the at least one of the parallax and the stereoscopic depth cue for the location of the observer viewing the displaying object through the curved mirrored surface at an angle greater than 5° from an axis of symmetry of the curved mirrored surface.

According to a sixth aspect of the invention, there is provided a method for operating an immersive display, the method comprising:

determining a shape of at least one of a curved mirrored surface and a display screen such that when an object is viewed reflecting from the curved mirrored surface which images the display screen, a virtual image of the object is produced, providing at least one of a parallax and a stereoscopic depth cue;

providing the curved mirrored surface and the display screen at a distance smaller than the distance that would produce collimated light when reflecting from the curved mirrored surface;

displaying the object on a display screen to provide an image rendering that is immersive due to the at least one of the parallax and the stereoscopic depth cue.

According to an embodiment, providing the curved mirrored surface and the display screen at said distance, if the virtual surface is at a distance that is less than 60 ft or 18.288 m, provides a vergence angle between the eyes of the observer greater than 0.2° when the observer views the virtual image.

According to an embodiment, the curved mirrored surface provides a field of view greater than 30° in at least one direction.

According to an embodiment, the method further comprises producing sound at a plurality of locations about the immersive display to make the sound having a source location consistent with the immersive image rendering.

According to an embodiment, the method further comprises providing user controls for interacting with contents of the virtual image.

According to an embodiment, the method further comprises, prior to displaying the object on the display screen, applying an image correction to the object to provide perspective image rendering.

According to an embodiment, displaying the object on the display screen comprises determining the at least one of the parallax and the stereoscopic depth cue for the location of the observer viewing the displaying object through the curved mirrored surface at an angle greater than 5° from an axis of symmetry of the curved mirrored surface.

According to another aspect of the invention, there is provided a work station, simulator or other environment which comprises at least one of the aforementioned optical elements and at least one of the aforementioned display elements, where the display element is in relation with a computer to control its display and to implement any one of the embodiments of the method according to of the invention.

BRIEF DESCRIPTION OF THE DRAWINGS

Further features and advantages of the present disclosure will become apparent from the following detailed description, taken in combination with the appended drawings, in which:

FIGS. 6-9 are respectively a perspective view, a top view, a front view and a side view of an immersive work station, according to another embodiment;

FIG. 22 is a top view illustrating image display in a simulator using a direct-projection screen, according to the prior art;

FIG. 23 is a top view illustrating image display in a simulator as should be seen by two pilots, according to the prior art;

FIG. 24 is a top view illustrating image display in a simulator using a collimating mirror, according to the prior art;

FIGS. 25-26 are a side view and a perspective view illustrating a flight simulator;

FIG. 31 is a flowchart illustrating a method for controlling, in a display, a virtual image of a displaying object for which displaying is controllable, according to an embodiment; and FIG. 32 is a flowchart illustrating a method for operating an immersive display, according to an embodiment.

It will be noted that throughout the appended drawings, like features are identified by like reference numerals.

DETAILED DESCRIPTION

Figure 1:
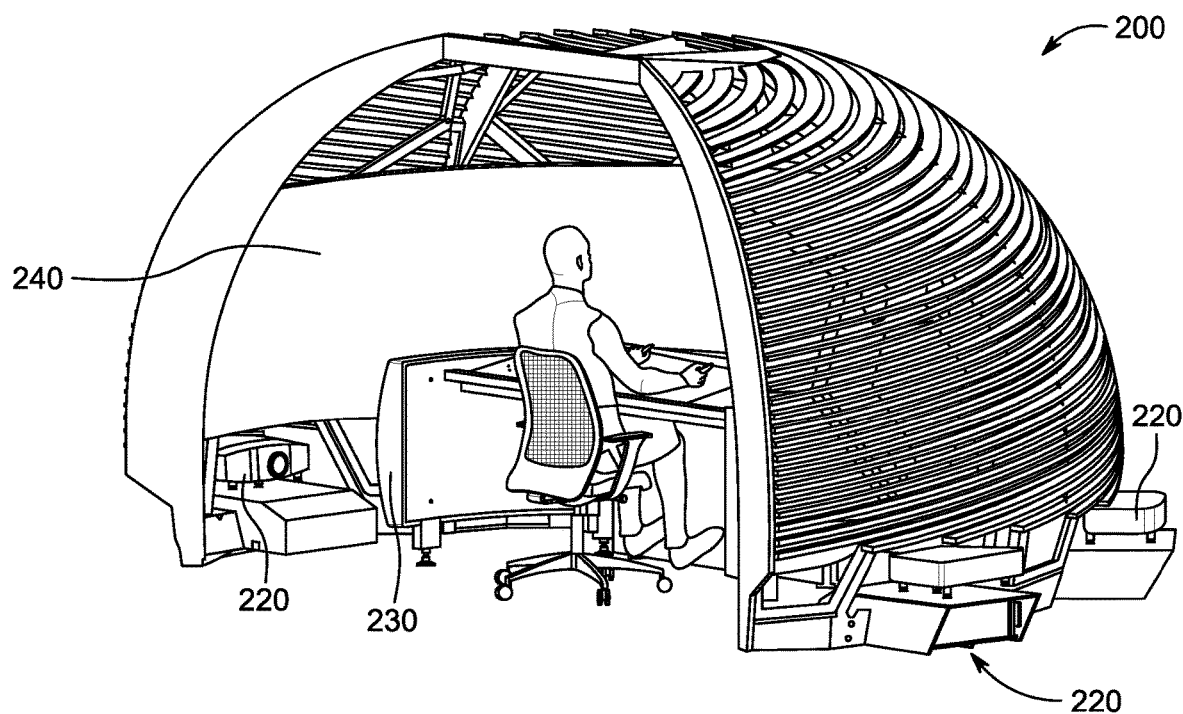
FIGS. 1-5 are respectively a perspective view, a front view, a top view, a side view and a rear view of an immersive work station, according to an embodiment.

Mirrors can be used as displays in various contexts since they allow presenting images in ways that screens are unable to reproduce.

Notably, the flight simulation industry makes use of concave mirrors to produce a virtual image that can be seen by both pilots in the cockpit with the exact same angle. This is an exemplary and widespread implementation of collimated displays, which involve mirrors.

The advantages of using virtual image display on concave mirrors, compared to other types of displays, can be seen in FIGS. 22-27. These figures show a technological context in which collimated displays can be used, according to the current state of the art in flight simulators.

It should however be noted that the method described further below for controlling the display can be used advantageously in other technological settings and for other applications, although the advantages for flight simulators are readily apparent since collimated displays are already used for this application.

FIG. 22 shows a direct-projection screen display (i.e., not a collimated display) used as a flight simulator environment in which two observers, i.e., both pilots, are installed in a cockpit and have a cross-cockpit view displayed on a direct projection screen as most people are accustomed to in everyday life. This type of display is not well suited to this application where two observers are present, since the screen is located at a limited distance from both observers and therefore, each observer will see a given object displayed on the screen at a different angle, whereas in real life, they should appear at substantially the same angle for both pilots, since the real-life object would be distant from both pilots, as shown in the explanatory diagram of FIG. 23. Direct-projection displays therefore produce an angular error for at least one of the two observers that negatively affects the quality of the simulation. In the flight simulation example, it is imperative that both training pilots see distant objects at the same angle to provide the pilots with high-quality training. In addition, depth cues between objects on the projection screen and objects outside the projection screen provide similar cues for depth, resulting in the observer perceiving the image as a flat image, with no sense of the image extending beyond the projection screen.

FIGS. 24-25 illustrate a state-of-the-art flight simulator using a collimating mirror that is exposed to a source image (the "object") and that images a virtual image at infinity (at least approximately). "Infinity" should be interpreted as it is typically defined in optics, i.e., far away, at a distance substantial greater than the focal length.

Imaging at infinity is advantageous as it provides the same angle of view of a given distant object for both observers, for instance pilots, as shown in FIG. 24, even though the observers are located at different positions with respect to the mirror. In this case, the state-of-the-art collimated display provides the same cross-cockpit view from both seats.

Figure 27:
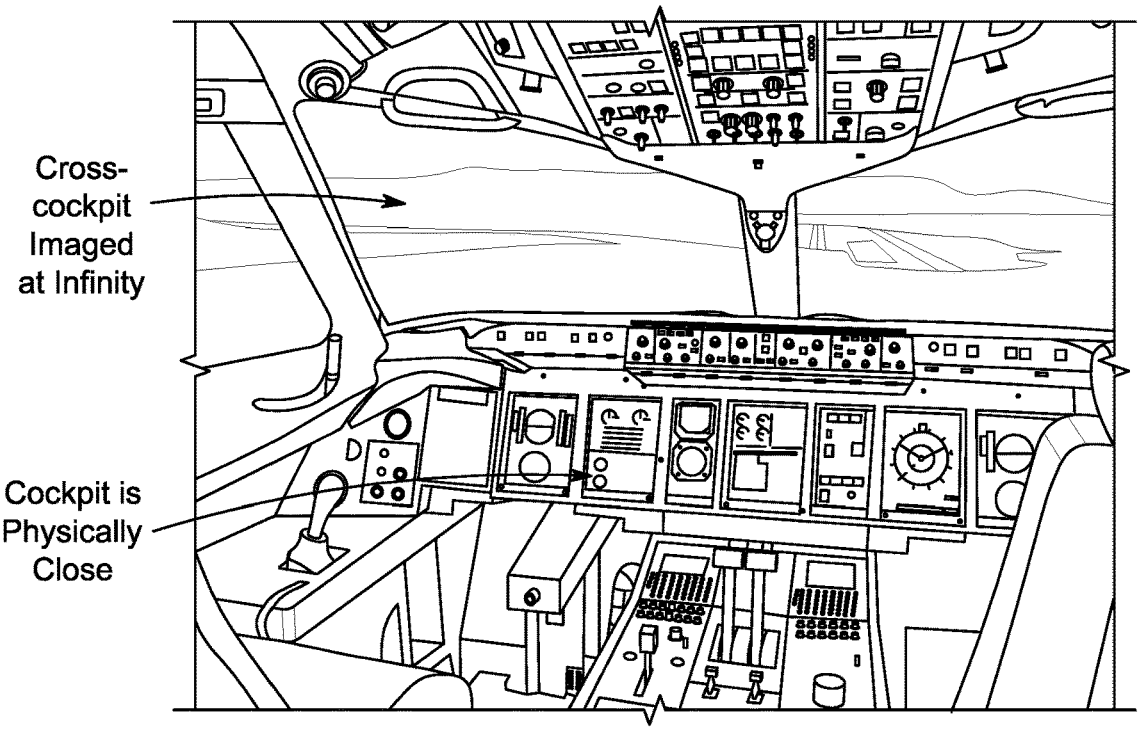
FIG. 27 is a picture illustrating image display in a simulator, according to the prior art.
Figure 28:
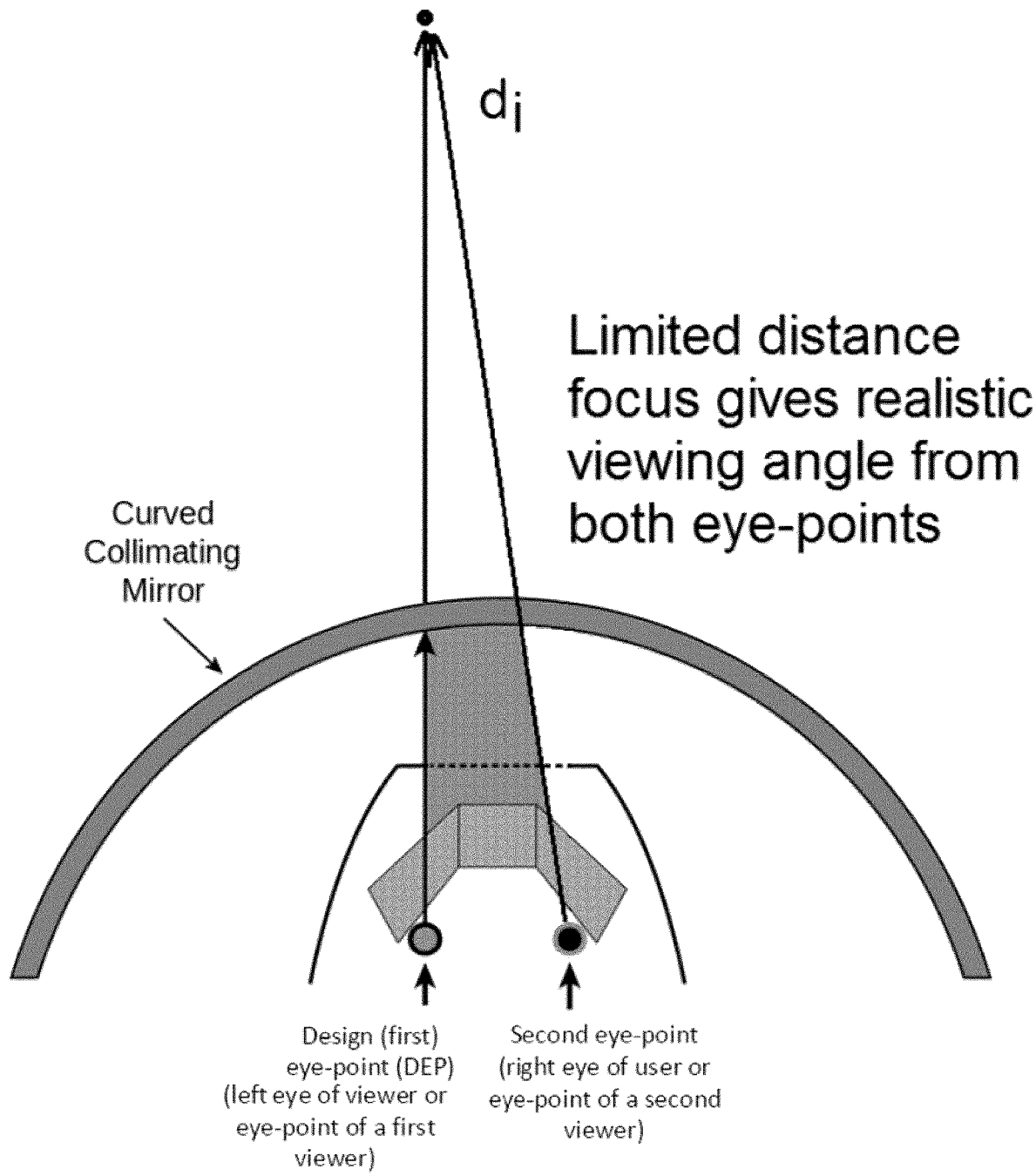
FIG. 28 is a top view illustrating image display in a simulator as seen by two pilots, according to an embodiment.

As shown in FIG. 27, when pilots are in the cockpit and look at their command instruments in the cockpit dashboard, and then look at the cross-cockpit view, their eyes must refocus and reorient, giving a sense of realism greater than that of direct-projection displays. This sense of realism originates from a physiological reaction (i.e., the eyes that refocus and reorient) induced by the fact that the display is a collimated display which produce an image located at infinity where other elements in the field of view (such as the dashboard) are located at a finite distance from the observers.

Figure 21:
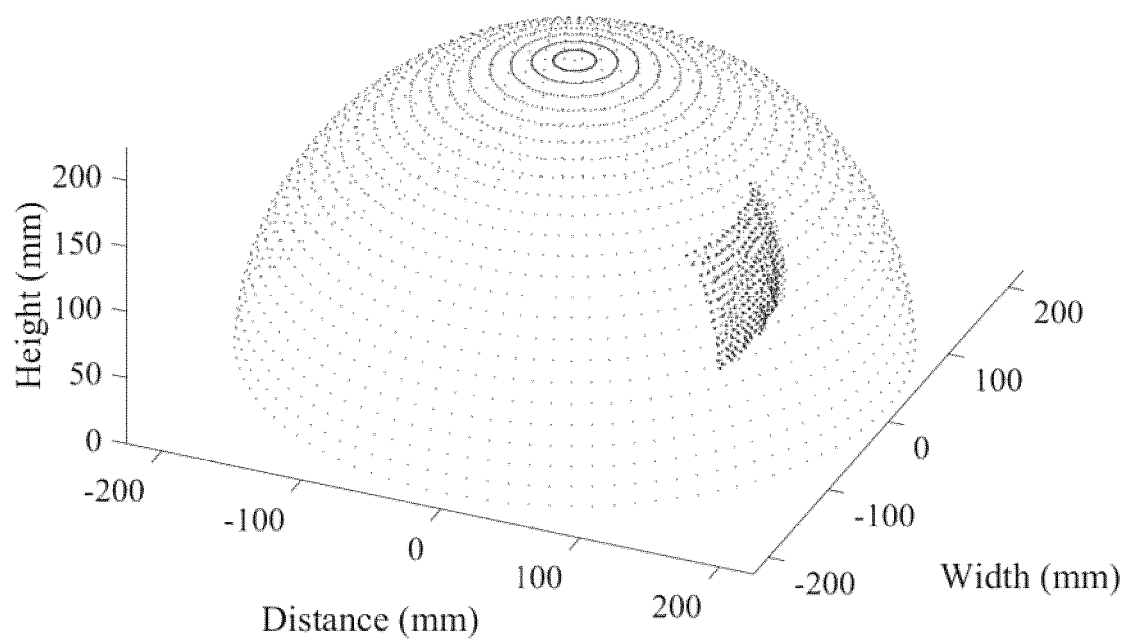
FIG. 21 is a graph illustrating stereoscopic measurements in purple, and corresponding simulated measurements in red, according to an embodiment.

The overall physical setting of such flight simulators in shown in FIGS. 21-22.

However, even though typical simulators, or more generally, collimated displays, produce an image at infinity, doing so is not always desirable, as the simulation (or other contents being displayed) may include objects that would normally be close to the viewer. The image therefore does not appear realistically, or specific elements are voluntarily excluded from the contents being displayed to avoid a lack of realism. The method according to the invention for controlling how virtual images are produced, disclosed herein below, addresses this drawback of typical collimated displays.

Furthermore, in a typical collimated display with virtual images at infinity, both eyes of an observer are directed in the exact same direction since the object is imaged at infinity and at a fixed angle for both eyes of the observer. However, in a real-life setting, there would be a slight angular difference between both eyes of a viewer viewing the same element. In this case, the slight angular difference of a virtual image between both eyes of a viewer would serve as a cue interpreted by the viewer to determine the distance of what is being seen. This is missing in a typical collimated display with virtual images at infinity. The lack of this cue can be confusing and does not provide adequate realism. Again, the method disclosed herein below for controlling how virtual images are produced addresses this drawback of typical collimated displays.

There is described below a method for determining and controlling the location of a virtual image produced in a non-planar mirror display that is far more robust in terms of realism than the level of performance of typical collimated displays. Examples of results of calculations made during the course of the control method are provided below and in the appended figures and show the results for a 2D parabolic mirror viewed at large angles with respect to the optical axis of the parabola, and for a hemispherical mirror. These results are in agreement with ray-tracing simulations as well as experimental measurements. This technique can be extended to be used for other types of mirrors, as well as for image formation for off-axis lenses. Display of virtual images, such as a display for a simulator, can thereby be improved.

Mirrored surfaces are used in a wide variety of applications, including anamorphic art, panoramic imaging tools, Pepper's Ghost-based displays, and collimated flight simulator displays. In all of these applications, objects are viewed as a virtual image observed through a mirrored surface. The image of this object viewed in the mirror and produced by the mirror is known as the virtual image of this object. It is advantageous and sometimes necessary to determine precisely the location of this image. Typical applications involving mirrored surfaces control the projection and display of the image using standard models which are based on the hypothesis that linear approximations can be made. Precision in location is therefore degraded when these conditions are not met. However there remains a lack of control techniques suitable for this purpose.

There are two primary reasons for the lack of techniques. One is due to the breakdown of Gaussian optics, and consequently popular physics equations such as the thin lens equation or paraxial mirror equation. These equations, while extremely useful for determining virtual images close to the optical axis of lenses or mirrors, are based on linear approximations and thus are not valid for objects or viewers that are at large angles with respect to this axis. For example, equations based on linear approximations are usually not applicable when the viewer is away from the axis of symmetry of the mirror or lens, such as more than 5°, or more than 10°, or more than 15° away from the axis of symmetry.

The second reason arises due to typical misconceptions on virtual images themselves. The virtual image of an object viewed through a lens or reflecting from a mirror is commonly portrayed as if it is independent of the viewer's position, though in fact this is only true when the object is viewed close to the optical axis of the lens or mirror. The method of controlling imaging in typical displays therefore constrains the possible positions that the observer can take while maintaining the performance of the display at an acceptable level of realism. To complicate matters further, the location of a virtual image viewed by a human observer is a psychological phenomenon, which depends on several depth cues that sometimes conflict. In a typical display where images are controlled under these assumptions, this can lead to surprising results, including the virtual image location changing when a viewer tilts her head.

In order to accurately determine the location of a virtual image, including when viewed off the optical axis of a lens or non-planar mirror, one must depart from Gaussian optics, have a proper understanding of the different depth cues used to determine the depth of the object as well as their relative importance, and find a practical way to resolve these conflicting cues. The method described herein for controlling imaging in a display involving virtual images makes use of these considerations.

The human brain uses a wide variety of depth cues to determine the depth of an object. These cues consist of both physiological and psychological cues. The depth cues affected by a mirror's and object's shape are the physiological cues which involve ocular reactions, including accommodation, convergence, and binocular and monocular parallax.

The accommodation cue for depth arises from the need to bend or relax the lens of the eye in order to see an image in focus. The amount of constriction for the lens that is necessary to bring the image into focus is perceptible by the brain and gives a cue to the rough distance of the image from the eye. This cue for depth is known as accommodation, though it is the cue relied on least by the human brain to infer depth. This cue only tends to contribute to perceived depth for objects (or virtual images in the instant case) less than about 2 m from the viewer.

The convergence cue arises from the need for the eyes to be directed at slightly different angles to see an image clearly. The angle between the eyes is used as a cue for depth, though this cue is only effective up to object distances (or virtual image distances) of approximately 10 m.

The final two cues arise from viewing an object from at least two different viewpoints. Binocular parallax arises from the brain seeing an image from both eyes at once (i.e., each eye independently receives an image seen from a different angle, simultaneously). Monocular parallax comes from the brain seeing an image from different locations at different times (e.g., observing the same object after having moved to a different relative location). In both cases, the brain is able to infer depth based on the relative movement of objects viewed from the two or more different locations. Binocular parallax is an effective depth cue up to a distance of about 20 m. The strength of the monocular parallax cue depends on the amount of movement of the head. Movements of only a few millimeters are sufficient to contribute to perceived depth with monocular parallax.

For real world objects viewed directly, these cues will give depth cues that are all in agreement. When viewing virtual images in lenses or mirrors, however, these cues can give conflicting results. For instance, when viewing objects through a lens or reflecting from a mirror, where the viewer needs to focus their eyes to see an image often differs from where the viewer sees the image via stereoscopic cues, a problem sometimes referred to as the vergence-accommodation conflict. This conflict also occurs when viewing an object reflected from a curved mirrored surface, and so must be accounted for when controlling the virtual image location for a display application. By properly taking into account depth cues, and by modelling a specific setting by tracing rays from a viewer, to a mirror, and to an object, one can determine the virtual image location to eventually control the display for better realism and improved viewer comfort.

The method outlined herein below for determining a virtual image has two bases: first, using techniques valid where standard Gaussian techniques are not, and second, simplifying the problem of the many different, conflicting depth cues used by a human observer into a simpler, resolvable problem.

The problem is simplified by determining the virtual image of an object by fixing a specific location for an observer, and then determining the perceived location of the virtual image to this observer based on either parallax or binocular parallax cues.

One such method to determine the location of a virtual image for an observer relies on tracing rays from an object point that, when reflected appropriately from a mirrored surface, will strike the two eyes of the observer. This can readily be done numerically in a software program such as Zemax. Based on the angle between the two rays directed to the observer eyes, the perceived depth of the object based on stereoscopic parallax can be found using the following equation:

$$D = \frac{B}{\tan\phi} \tag{1}$$

where D is the distance of the object point from the left eye, B is the distance between the two eyes, and $\phi$ is the convergence angle made between the two rays originating from each eye.

This method is demonstrated below for a planar display reflecting from a spherical mirror. The ray-tracing process was performed in Zemax by defining two eye points for a viewer, a hemispherical mirror, and an object screen. In this ray model, 1,680 primary rays were defined with respect to the left eye, ranging in horizontal angles from $-12°$ to $12°$ in increments of $0.4°$, and vertical angles ranging from $10°$ to $-4°$ in increments of $0.5°$. Depth measurements were obtained using secondary rays, originating from the right eye, that were initially set parallel to their corresponding primary ray. These ray directions were then iterated until the secondary rays and primary rays converged to a point on the object screen. The angle between these rays was then used to triangulate the depth relative to the observer using equation 1.

Figure 18:
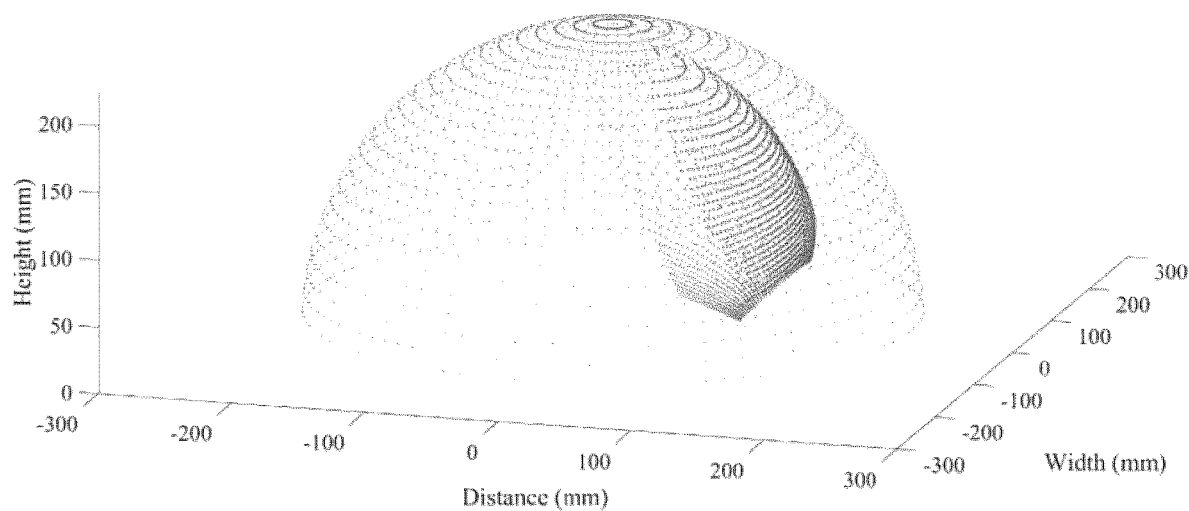
FIG. 18 is a graph illustrating a virtual surface of planar display screen reflecting from a hemispherical mirror, including, in blue, virtual image points calculated based on ray-tracing performed in Zemax, according to an embodiment.

These virtual image points of a planar display screen, reflecting from hemispherical mirror, are shown in blue in FIG. 18 along with virtual image points determined using the method described further below, and show strong agreement.

Another example of a method that determines the location of a virtual image for an observer at a specific location that relies on small horizontal parallax cues will be described in detail further below. This method determines a virtual image location based on the horizontal parallax cue, which is for movement of the observer's head along a direction parallel to the plane defined by the floor or the ground. Human observers are far more likely to move in directions parallel to the plane they stand on than they are to move up and down vertically, or to move their head forward and backward, so this result is the most important for most applications. In addition, this cue is equivalent to the stereoscopic parallax and convergence cues. Cues such as accommodation are ignored as they do not significantly contribute to perceived depth at distances greater than 2 m, and parallax cues for movement in different directions is ignored since human observers are much less likely to move in these directions. This results in depth cues that are in agreement with one another, and hence a single virtual image can now be determined in order to control the display.

There is described below one such method for determining parallax depth cues for an observer viewing an object from a non-planar mirrored surface. This method departs from Gaussian optics by treating every point on the surface as its own mirror with its own orientation and curvature, rather than treating the mirror as a whole.

For example, considering an object that is viewed reflecting from a two-dimensional parabolic mirror governed by the equation:

$$y = a \cdot x^2 \tag{2}$$

the thin lens equation is sufficient for determining the virtual image of this object when the observer and object are near the optical axis. However, when the observer views the object reflecting from the parabolic mirror at large angles relative to this axis, this formula breaks down. One can try to deal with this breakdown by accounting for a series of optical aberrations, but an alternative approach is to take into account the viewer's location, and then to treat the portion of the parabola the observer views the object from as its own separate mirror in order to determine the virtual image point.

To clarify, every piece of the parabola can itself be thought of as its own small mirror, with its own curvature. In mathematics, the circle that best fits a curve at a point is known as an osculating circle. For a two-dimensional parameterized curve, this curvature is:

$$R = \frac{((x')^2 + (y')^2)^{3/2}}{|x'y'' - y'x''|} \tag{3}$$

For the two-dimensional parabola described above, the radius of curvature at any point is given by the following expression:

$$R = \frac{(1 + 4a^2x^2)^{3/2}}{2a} \tag{4}$$

Using this equation, every infinitesimal portion of the parabola will be approximated as a circular mirror. What remains is to determine the image point to be controlled on the mirror display for an object viewed by an observer through a circular mirror.

This requires tracing two rays from an object that reflect from a circular mirror, and solving for the point that these two rays appear to be originating from, a point known as the virtual image point of the object. A diagram of two such rays reflecting from a spherical mirrored surface is shown in FIG. 1.

Figure 13:
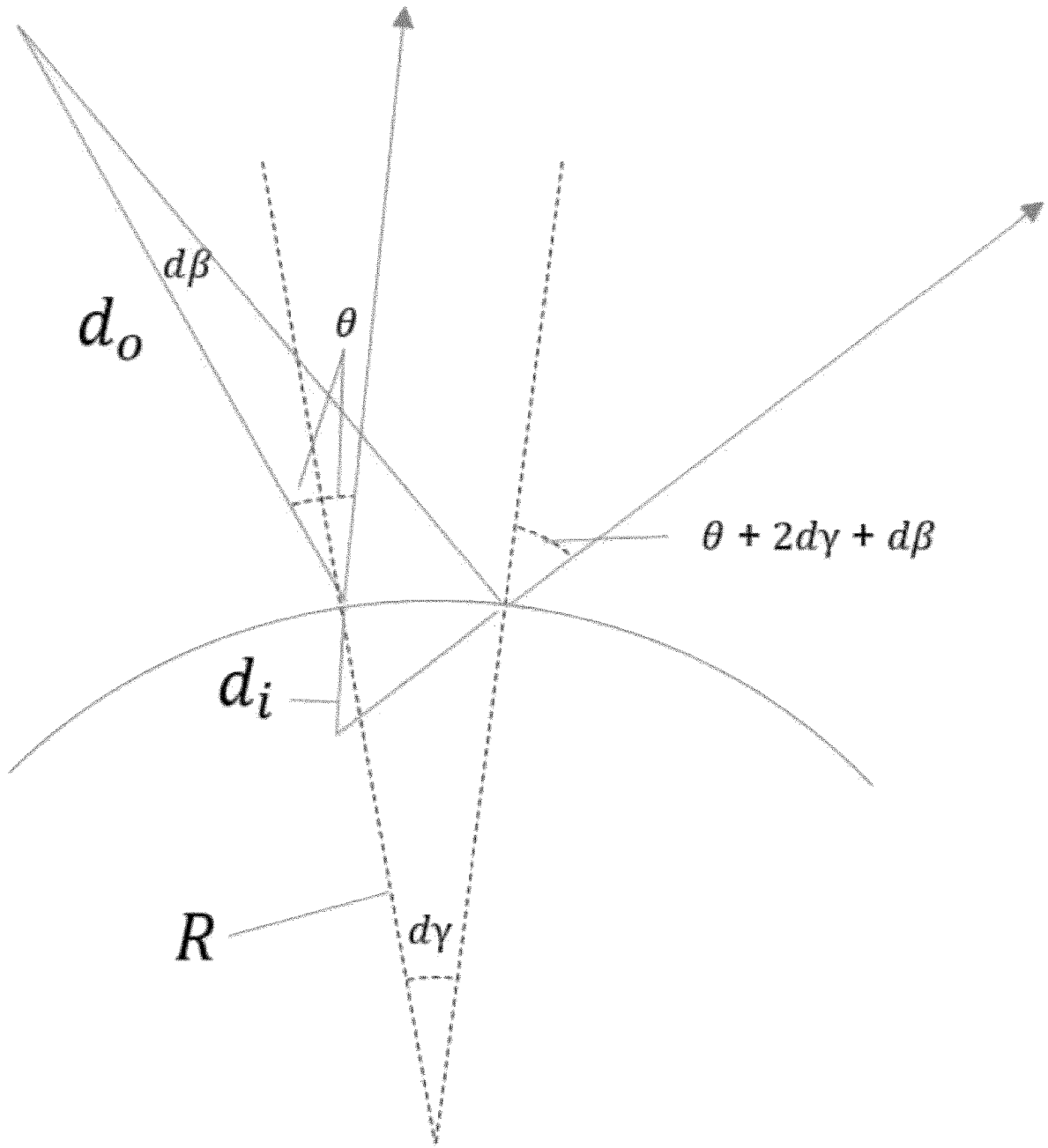
FIG. 13 is a drawing illustrating two light rays reflecting from a spherical mirrored surface, according to an embodiment.

In FIG. 13, $d_o$ is the distance of the object to the mirror along the primary ray, $\theta$ is the angle between the primary ray and the normal to the mirror surface, $d_i$ is the distance from the mirror surface to the virtual image point, R is the radius of curvature of the osculating circle at the mirror surface, $d\beta$ is the angle between the two rays originating from the object, and $d\gamma$ is the angle between the reflection points of the rays from the mirrored surface and the center of the osculating circle at the mirrored surface.

The total distance of the virtual image point from an observer can be determined by these two reflected rays. It will depend on the distance between the rays at the observer, E (equal to the distance between two human eyes for stereoscopic depth), and the angle between the two rays, $\alpha$:

$$d_i = \frac{E}{2\tan(\alpha/2)} \qquad (5)$$

Figure 2:
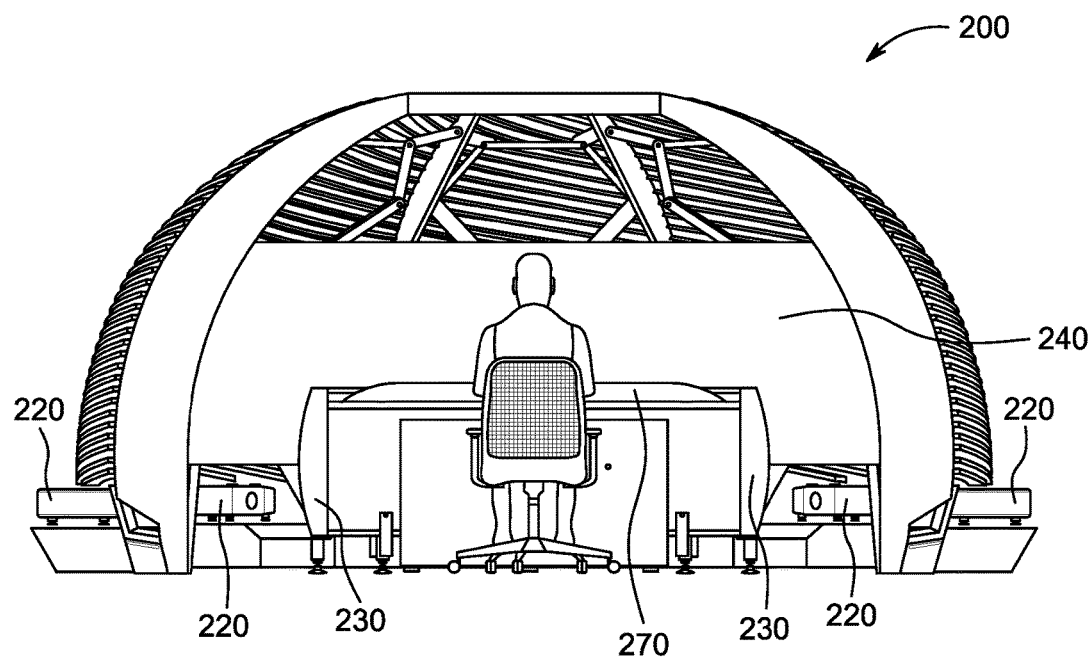
Figure 3:
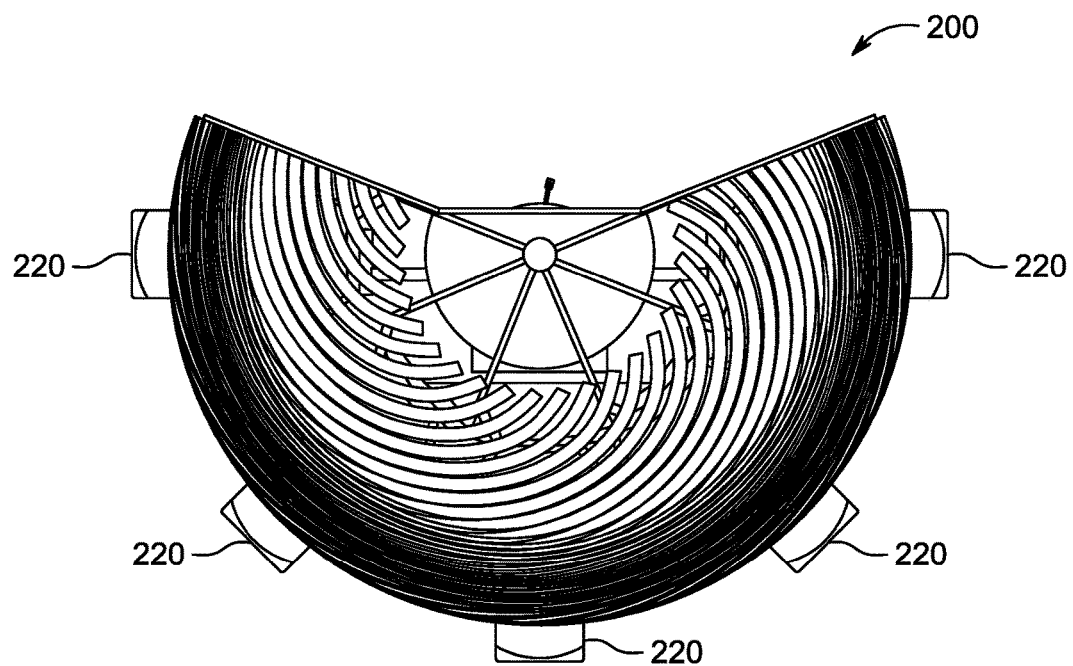
Figures 4, 5:
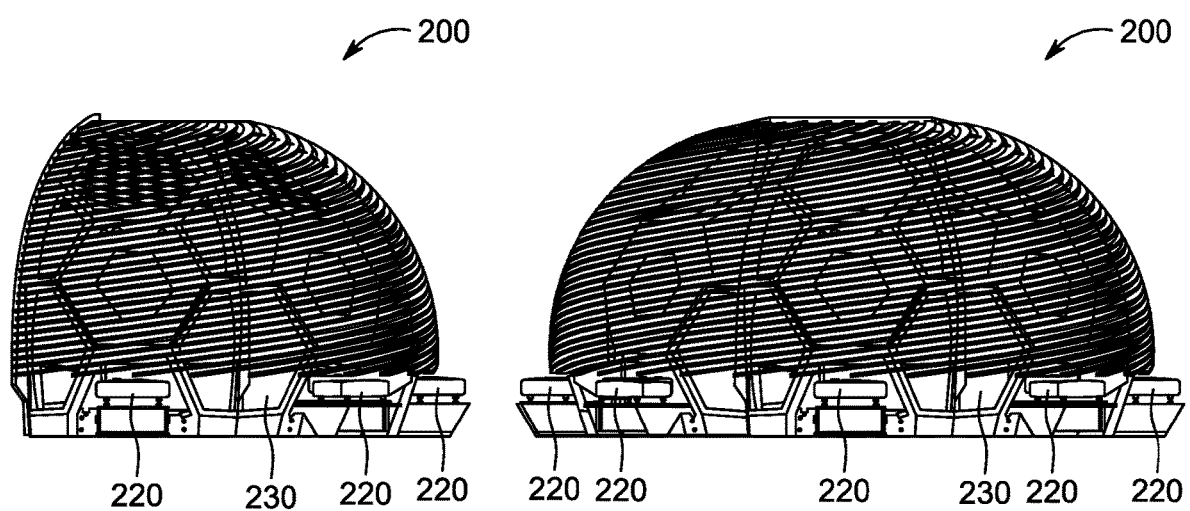
Figure 6:
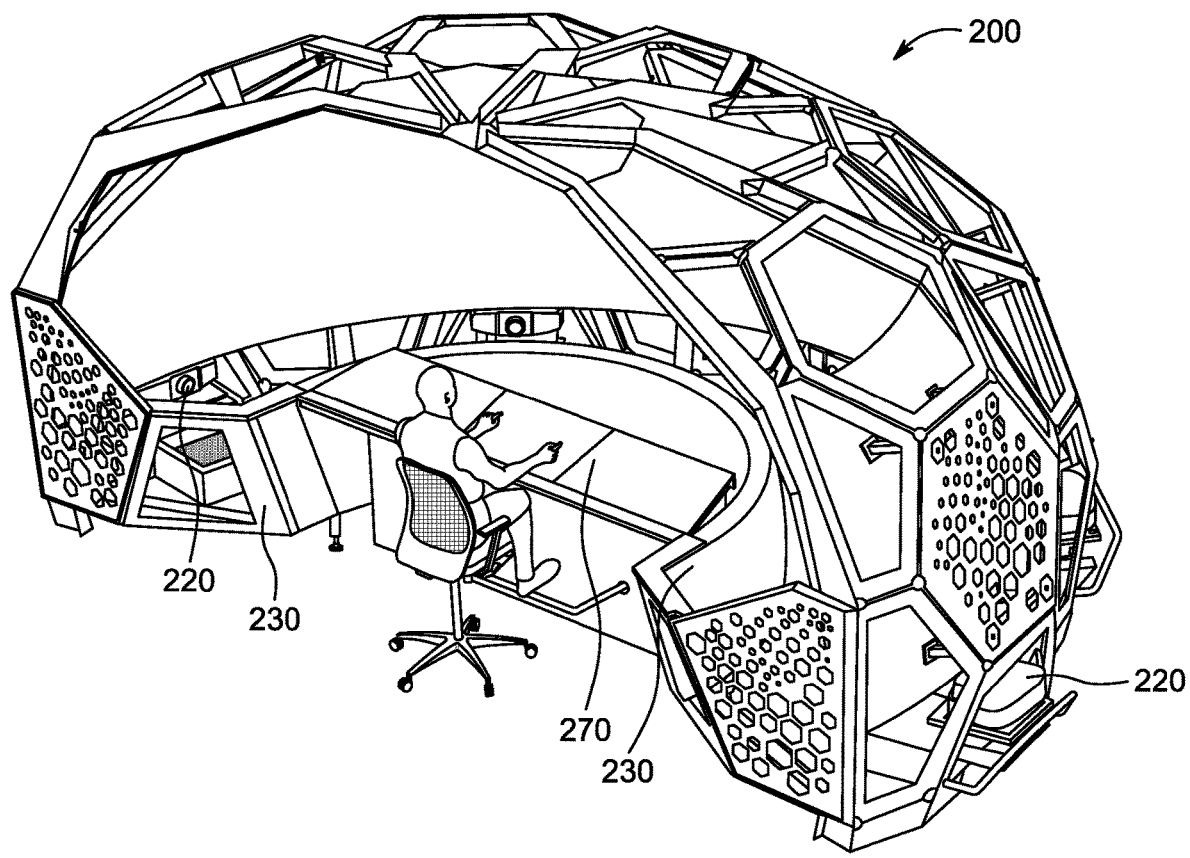

If the angle $\alpha$ is small, then a small-angle approximation on tan can be used. This is accurate to within 1% when alpha is less than about 0.35 radians (20°). For an observer perceiving distance based on their binocular vision, this angle corresponds to a distance of 0.19 m. For an observer viewing the two rays with a single eye (iris size approx. 4 mm), this corresponds to a distance of 0.012 m. For the following derivation, we will assume we are dealing with virtual image points that are further from the observer than these distances, and so we will be able to assume that the angle between the two rays in FIG. 2, $2d\gamma+d\beta$, is small.

Figure 14:
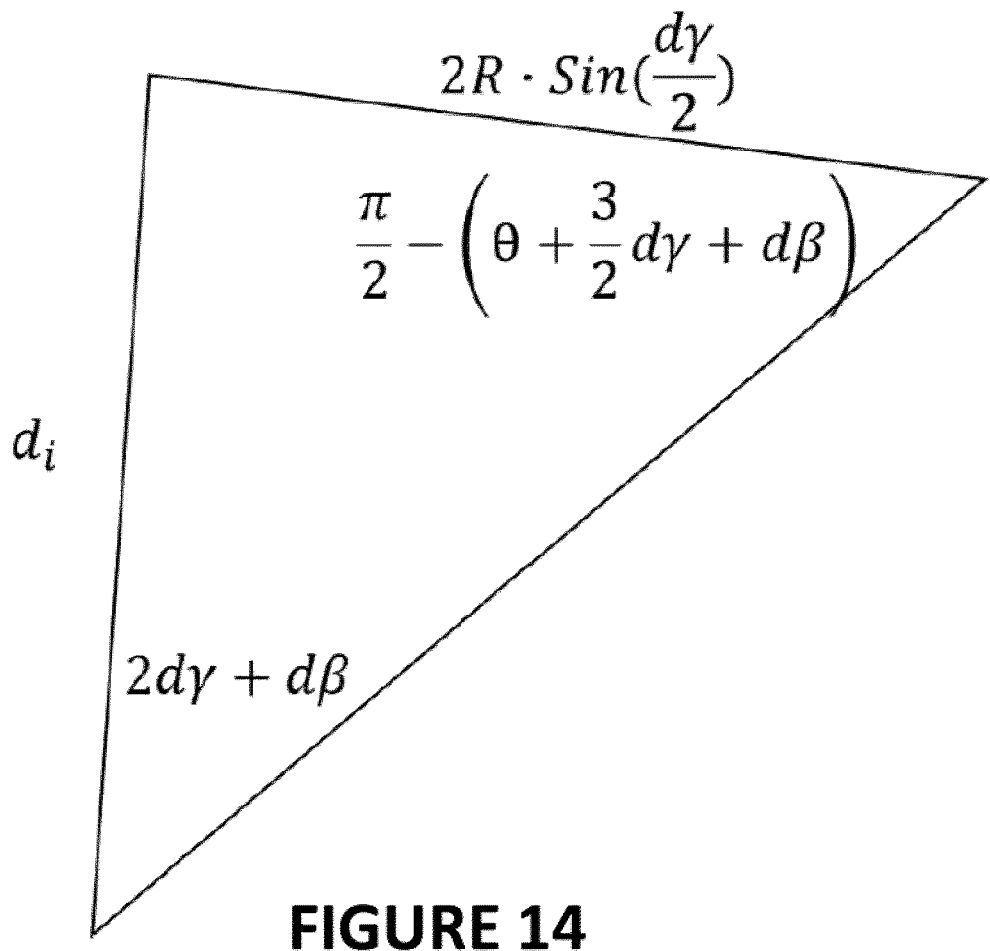
FIG. 14 is a drawing illustrating a triangle made by image point and the two points of reflection from the mirror's surface, according to an embodiment.

Taking the triangle shown in FIG. 14 made by the image point and the points of reflection of the two rays, and making use of the law of sines gives the following relation:

$$\frac{d_i}{\cos\left(\theta + \frac{3}{2}d\gamma + d\beta\right)} = \frac{2R\sin\left(\frac{d\gamma}{2}\right)}{\sin(2d\gamma + d\beta)} \qquad (6)$$

Taking advantage of the fact that $2d\gamma+d\beta$ is small (and consequently $d\gamma$ and $d\beta$ individually), the sine terms can be reduced to their first order terms:

$$d_i = \frac{Rd\gamma\cos\left(\theta + \frac{3}{2}d\gamma + d\beta\right)}{2d\gamma + d\beta} \qquad (7)$$

Making use of the cosine law of angular addition, gives the following relation:

$$d_i = \frac{Rd\gamma\left(\cos\theta - \sin\theta\left(\frac{3}{2}d\gamma + d\beta\right)\right)}{2d\gamma + d\beta} \qquad (8)$$

As long as theta is not large, we can retain only the first order of the expansion:

$$d_i = \frac{Rd\gamma\cos\theta}{2d\gamma + d\beta} \qquad (9)$$

Figure 15:
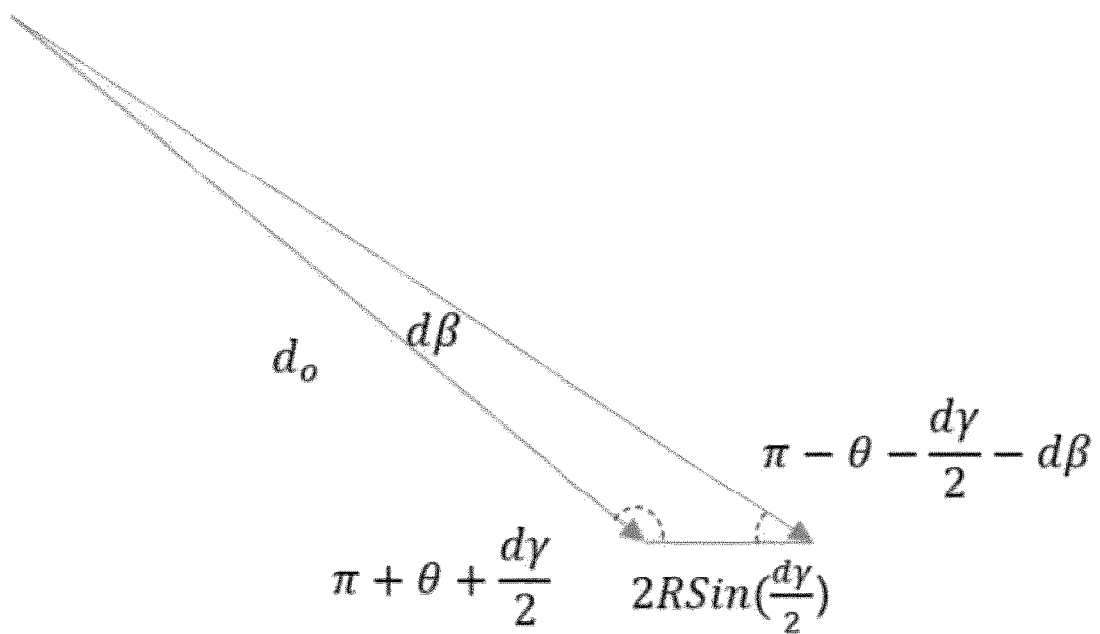
FIG. 15 is a drawing illustrating a triangle made by object point and two points of reflection on mirror's surface, according to an embodiment.

The triangle made by the object point and the two points of intersection of the two rays with the mirror has the properties shown in FIG. 15.

Once again making use of the law of sines gives:

$$\frac{\sin(d\beta)}{2R\sin(d\gamma/2)} = \frac{\cos(\theta + d\gamma/2 + d\beta)}{d_o} \qquad (10)$$

Utilizing the angular addition property of cosines gives:

$$\frac{\sin(d\beta)}{2R\sin(d\gamma/2)} = \frac{\cos\theta\cos(d\gamma/2 + d\beta) - \sin\theta\sin(d\gamma/2 + d\beta)}{d_o} \qquad (11)$$

Once again assuming small angles:

$$d\beta = Rd\gamma\frac{\cos\theta - (d\gamma/2 + d\beta)\sin\theta}{d_o} \qquad (12)$$

Keeping only the first order of the expansion gives:

$$d\beta = \frac{Rd\gamma}{d_o}\cos\theta \qquad (13)$$

Combining Equation 9 and Equation 13 gives:

$$d_i = \frac{d_o R\cos\theta}{2d_o + R\cos\theta} \qquad (14)$$

A useful, equivalent, form that can be used to design an object or display screen given a desired virtual surface and mirror shape is:

$$d_o = \frac{d_i R\cos\theta}{R\cos\theta - 2d_i} \qquad (15)$$

This equation, with an object near the optical axis viewed from an observer near the optical axis, gives the thin lens equation commonly used in Gaussian optics:

$$\frac{1}{d_i} = \frac{2}{R} + \frac{1}{d_o} \quad (16)$$

Figure 16A:
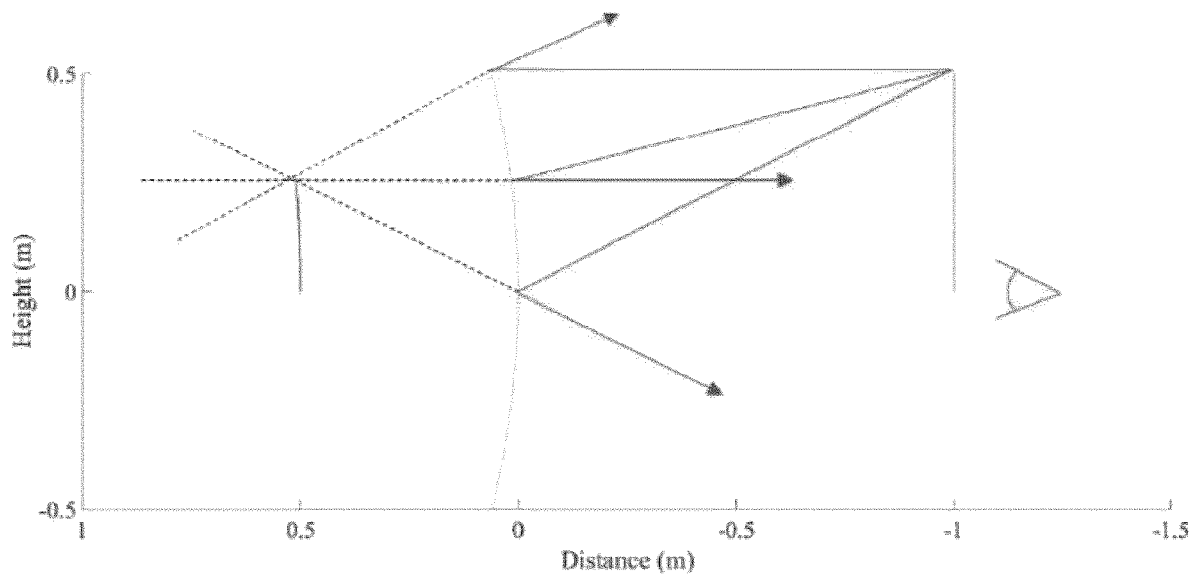
FIGS. 16A-16B are drawings on graphs illustrating a ray tracing showing distortion of virtual image for a viewer far from the optical axis of a parabolic mirror with 1 m focal length, according to an embodiment.
Figure 16B:
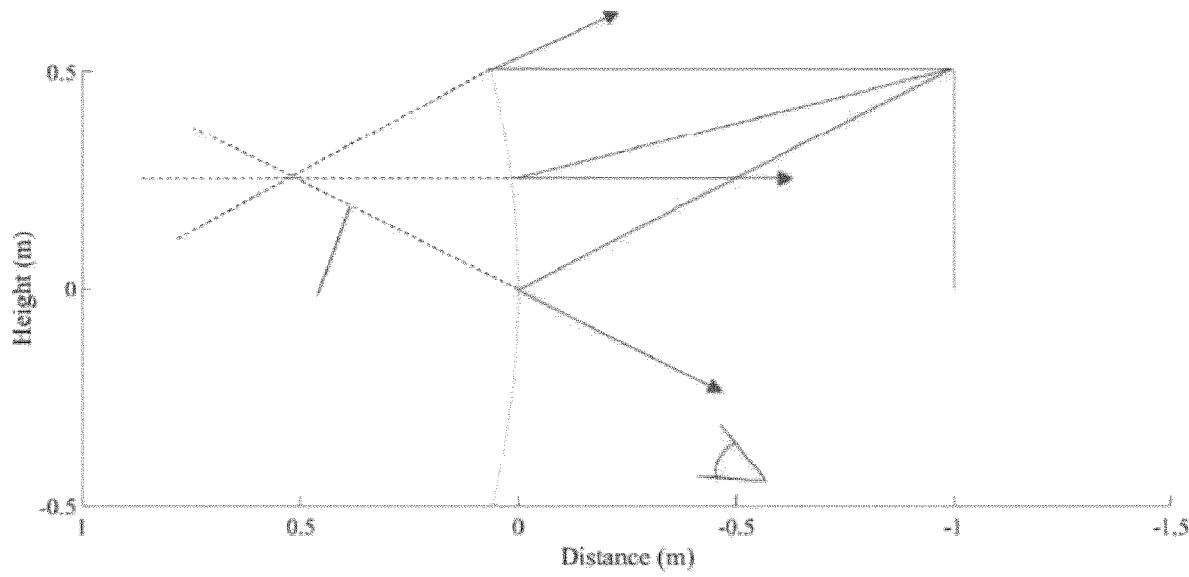

However, for objects large with respect to the focal length of the parabola, or when the viewer observes an object reflecting from the mirror far from the parabola's optical axis, these equations differ from the results of the thin lens equation. In FIGS. 16A-16B, the results of a simulation of a vertical line viewed reflecting off a parabolic mirror with 1 m focal length from two different locations is shown. Typical prior-art ray tracing lines are shown to emphasize the difference in results when the viewer views the reflected line near the optical axis and at angles far from the optical axis.

Virtual Image Points in Three Dimensions

In two dimensions, the angle between two rays reflecting from a mirror can be used to trace back to a virtual image point. As long as the two rays are parallel, then they will all diverge as if from the same point. In three dimensions, the situation is more complicated. Two nearly parallel rays will diverge at different angles depending on the plane they intersect the mirror. For example, two rays that strike the mirror in the plane of the mirror's optical axis (known as the tangential plane) will diverge at different angles than two rays that strike the mirror in the plane tangent to this plane (known as the sagittal plane). The solution to this problem is to determine which plane is used to determine depth, and work out the angle of divergence of two rays striking the mirror in this plane. This is done by first deriving the angle of divergence for two rays striking the mirror in an arbitrary plane, and then by determining the plane used for monocular parallax cues, assuming the observer moves horizontally, along the line connecting to observer's eyes (which, as already mentioned, is equivalent to the binocular parallax and convergence cues).

The equation for the distance from the mirror's surface to the virtual image point, in the tangential plane, is equivalent to that found for rays in two dimensions:

$$d_i = \frac{d_o R \cos\theta}{2d_o + R\cos\theta} \quad (17)$$

For three dimensions, the secondary ray in FIG. 13 is not necessarily in the same plane as the mirror's normal vector and the primary ray. In the plane of the two rays from the object, the primary ray makes an angle $\alpha$ with the mirror's normal vector (equal to $\theta$ if the plane happens to be the tangential plane, or zero for the sagittal plane). One can use Equation 17 to determine the virtual image depth in this plane as long as the following substitutions are made:

$$\cos\theta \rightarrow \cos\alpha \quad (18)$$

$$d_o \rightarrow \frac{d_o \cos\theta}{\cos\alpha} \quad (19)$$

$$d_i \rightarrow \frac{d_i \cos\theta}{\cos\alpha} \quad (20)$$

Incorporating these substitutions yield the following result:

$$d_i = \frac{Rd_o \cos^2\alpha}{2d_o \cos\theta + R\cos^2\alpha}, \quad (21)$$

or equivalently:

$$d_o = \frac{Rd_i \cos^2\alpha}{R\cos^2\alpha - 2d_i \cos\theta} \quad (22)$$

Setting $\alpha$ equal to $\theta$, and $\alpha$ equal to zero gives the results for the virtual image depth in the tangential and sagittal planes, respectively. For a spherical surface, where the radius of curvature is constant across the mirror's surface, these results simplify to the spherical astigmatic equations.

The final step to determine the virtual image point location is to determine the plane the eyes use to interpret depth via parallax. This can be done by projecting the interocular vector (a vector pointing from one eye of an observer to the other eye of the observer), $\hat{E}$, onto the surface of the mirror. The resulting projected unit vector, $\hat{e}$, is:

$$\hat{e} = \frac{\hat{E} \cdot \hat{u}_1 + \hat{E} \cdot \hat{u}_2}{|\hat{E} \cdot \hat{u}_1 + \hat{E} \cdot \hat{u}_2|} \quad (23)$$

The angle $\alpha$ is:

$$\alpha = \tan^{-1}\left(\frac{\vec{d}_o \cdot \hat{e}}{d_o \cos\theta}\right) \quad (24)$$

where $\hat{u}_1$ and $\hat{u}_2$ are unit vectors that define the plane tangent to the mirror's surface, $\hat{e}$ is the unit vector of the interocular vector projected onto the mirror plane, pointing from one eye to another to indicate the plane of stereoscopic measurement.

Since the position of the observer and the geometry of the mirror are known, all first-hand values are known except $\vec{d}_o$ (and its module $d_o$). Equations (22), (23) and (24) can thus be resolved numerically to find the vector $\vec{d}_o$ of a given point object that creates the virtual image where needed (i.e., at the virtual image distance $d_i$ where the viewer should see it). Calculating the $\vec{d}_o$ for every point forming a complete object is performed. As described further below, this calculation can be used to design a front or rear projection screen, where each point of the image mapped onto this projection screen has the appropriate $\vec{d}_o$.

Alternatively, given an object or display screen and an observer location, a mirror shape can be designed such that the distance from every point on the object to the mirror results in the desired image distance.

The virtual image point can then be found using these equations by partitioning the mirror into pieces, and determining the orientation and radii of curvature of these partitions. An example calculation with experimental verification will next be described for a hemisphere, but this technique could be extended to a mirror of an arbitrary curved surface. This requires determining the effective radius of curvature along different planes of the mirror's surface and then replacing R in Equation 21 with a radius of curvature that depends on the relevant plane, $R(\alpha)$.

Virtual Surface of a Hemisphere

The virtual surface for a planar display viewed by an observer reflecting from a hemisphere was determined using this technique. The process for determining the virtual surface was to trace a primary ray from a point on the display, and then to iteratively solve for the location on the mirror where the ray reflected from the mirror to the mirror without violating the law of reflection. The location of reflection on the mirror was modelled as a small mirror with an optical axis parallel to its normal vector. The angle between this axis and the primary ray was θ. Utilizing a spherical coordinate system, the polar angle and azimuthal angles were used for $\hat{u}_1$ and $\hat{u}_2$, respectively. Using Equation 21, the value of $d_i$ was determined, and the primary ray was traced from the observer and past the mirror's surface a distance di to determine the virtual image point location.

Figure 17A:
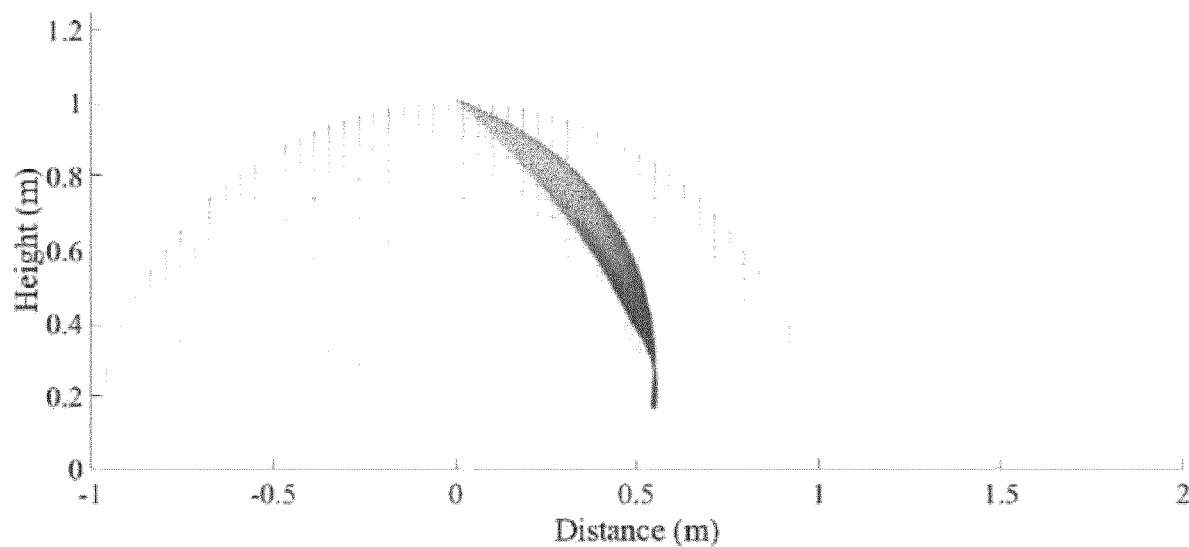
FIGS. 17A-17B are graphs illustrating a virtual surface of a flat display screen reflecting from a hemispherical mirror, according to an embodiment.
Figure 17B:
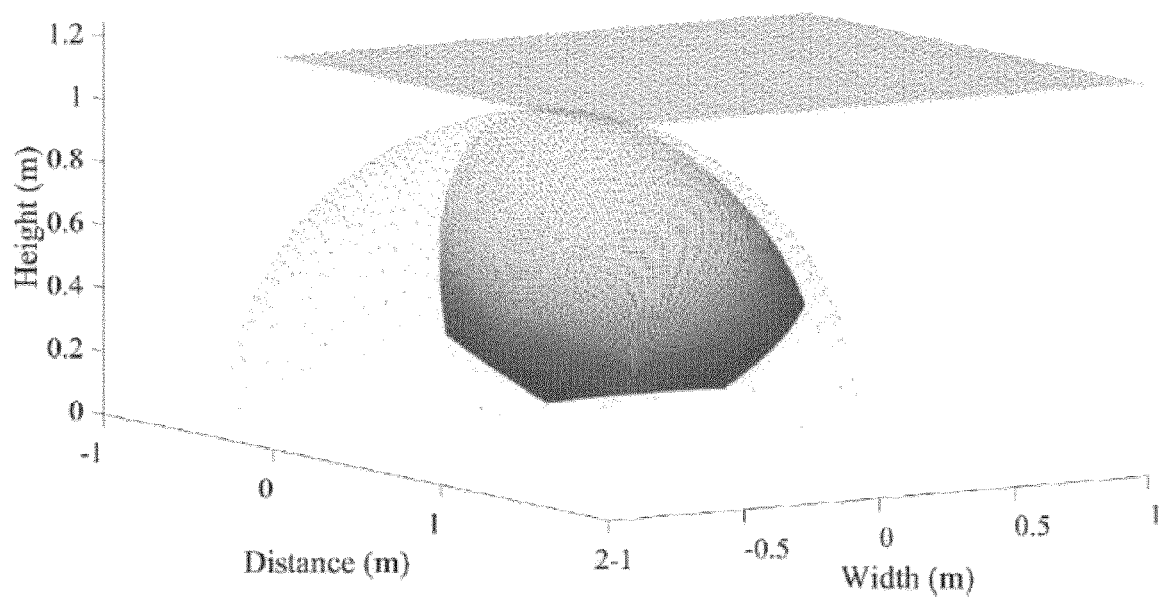

In the model, this process was done for every pixel to be projected on a planar (flat) display screen (e.g., a translucent direct-projection screen such as the screen 130 of FIG. 30 undergoing a projection, but with a flat shape; or as will be discussed below, a flat, illuminating screen such as a TV screen or monitor), forming the object. This screen forming the object would build up a virtual image of this screen reflecting from the hemispherical mirror. This virtual image is shown in FIGS. 17A-17B.

Experimental Verification

These results were verified by experimentally measuring the depth of image points reflecting from a mirrored surface using two cameras.

A silver-coated hemisphere made of acrylic with a diameter of 18" in diameter was used as the hemispherical mirror. A 55" LG OLED HD television was placed 15 mm above this hemisphere, and two Point Grey BlackFly cameras were placed and mounted on an optics table 686 mm from the hemisphere's center. A custom part was used to keep the cameras at a separation of 54 mm and to ensure the cameras were directed parallel to one another.

Figure 19:
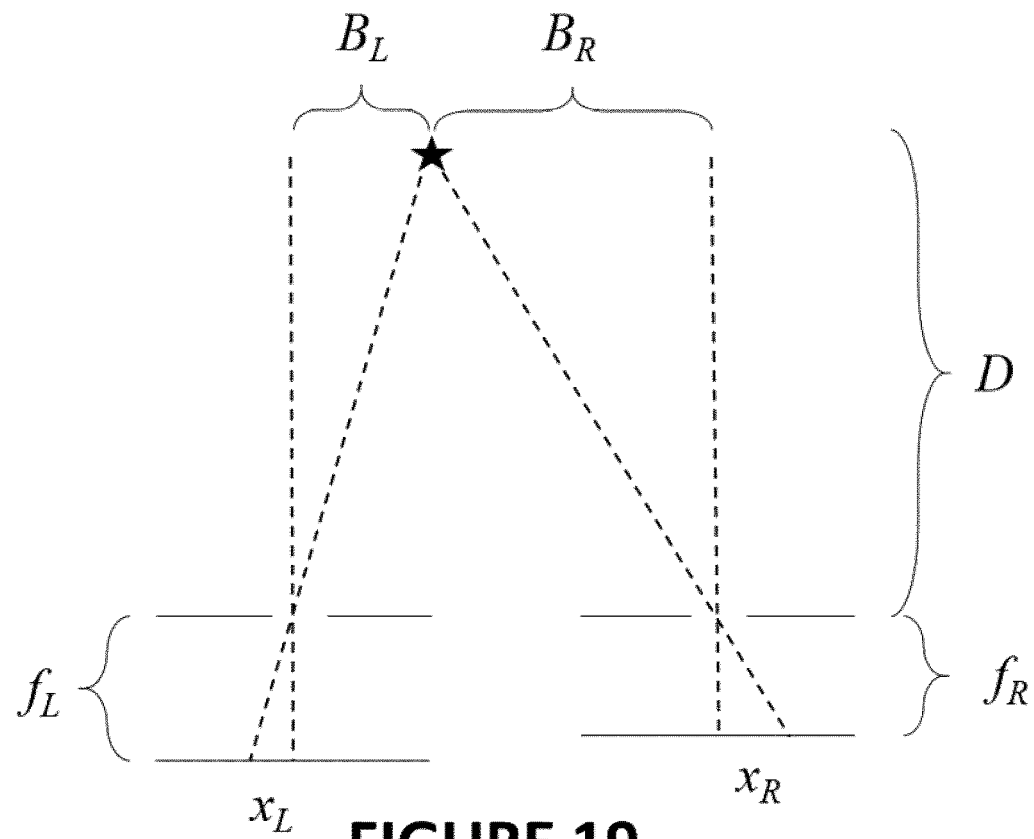
FIG. 19 is a schematic diagram illustrating stereoscopic measurements for pinhole cameras, according to an embodiment.

FIG. 19 shows stereoscopic measurements for pinhole cameras. The distance of objects relative to the two cameras were determined via triangulation, based on a technique often used in computer vision. Based on the distance between the two cameras, B, the focal length of the cameras, $f_L$ and $f_R$, and the measured location of the object in the two images, $x_L$ and $x_R$, the depths were determined using the following formulas:

$$\frac{x_L}{f_L} = \frac{B_L}{D}, \frac{x_R}{f_R} = -\frac{B_R}{D} \tag{25}$$

$$B_L + B_R = B = D\left(\frac{x_L}{f_L} - \frac{x_R}{f_R}\right) \tag{26}$$

$$D = B\left(\frac{x_L}{f_L} - \frac{x_R}{f_R}\right)^{-1} \tag{27}$$

The camera's focal lengths and their directions were calibrated in order to be able to convert a pixel location in an image to an angle from the camera's optical axis. The focal lengths of the cameras were calibrated by taking a photograph of a piece of graph paper that was marked with a grid of evenly spaced lines that were centered between the two cameras at a distance of 432 mm. The grid lines were spaced apart by 10 mm. The spacing between these grid lines in the captured images was measured to be 73+/−1 pixels for each camera. The CCD pixel spacing in each of these cameras was 2.8 μm. Using Equation 25, the focal lengths for both cameras were then determined to be 8.8+/−0.1 mm. The location on this graph paper measured to be located between the two cameras at the height of the cameras, 84.5 mm, was then marked with a pen. Photos were taken of this paper with both cameras, and the image of this point was measured to be a few pixels below and above the center of the images in the photo, indicating a slight vertical error in the orientations of the cameras, equal to 1.6° below the horizontal for the left camera, and 1.2° degrees below the horizontal for the right camera.

To complete the calibration, an image was taken for an array of evenly spaced points printed on a white piece of paper. The pixel locations of these points in the images were determined based on the photos of these points using Microsoft Paint. The depth and locations of these points were then determined using triangulation based on Equation 27. It was found that the depth measurements of points had a slight error, an error which increased radially with distance from the center of the image. The physical locations of these points were measured, and the difference in the calculated locations from the measured locations for each point were squared and added together. Radial distortion coefficients were determined by a minimization of the sum of the square differences. It was found that a radial distortion based on the Brown distortion model minimized this error. This lens distortion parameter was applied to all subsequent measurements.

$$r' = (1 + ar^2 + br^4 + cr^6 + dr^8) \tag{28}$$

where r is the distance of a pixel from the center of the image, in units of pixels. Parameters a, b, c, and d were fitted to reduce the sum of the square difference between using a simple minimization routine in Excel's Gsolver add-in. These values were fitted for the left and right cameras separately and were found to be equal to:

| Left Camera | Right Camera |
| --- | --- |
| a = 0.00 | a = 1.44 · 10^(−8) |
| b = 3.23 · 10^(−14) | b = 3.22 · 10^(−14) |
| c = 0.00 | c = 2.39 · 10^(−23) |
| d = 5.09 · 10^(−25) | d = 1.36 · 10^(−25) |

Figure 20:
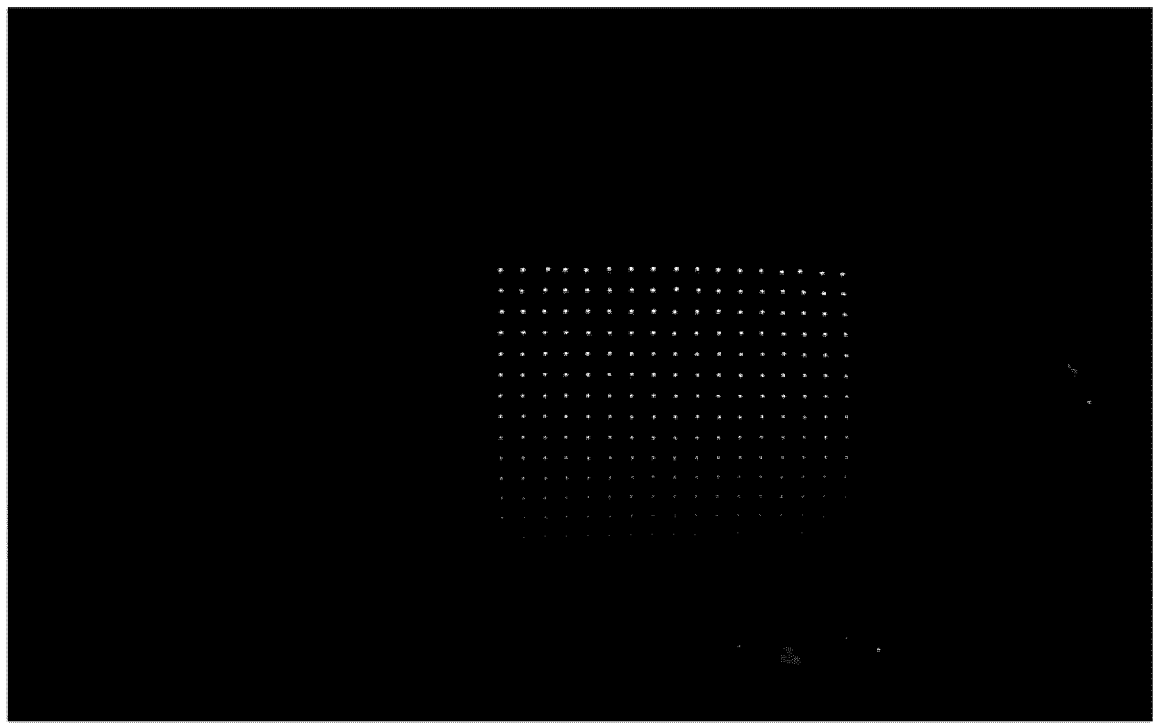
FIG. 20 is a picture illustrating a display screen reflecting from the spherical mirror in a dark room, the display screen displaying a black image with an array of lighted, white pixels, according to an embodiment.

Next, a picture composed of a black background and a grid of single white pixels was displayed on the OLED screen. These points were set to be approximately evenly spaced when viewed reflecting from the spherical surface. A picture of this screen reflecting from the hemispherical mirror was taken by each camera. The picture taken from one of these cameras is shown in FIG. 20, which is an image of a display screen reflecting from the spherical mirror in a dark room. The display screen is displaying a black image with an array of lighted, white pixels.

The pixel locations of each one of these points was measured using Microsoft Paint. The error in determining the location of each pixel was determined to be +/−one pixel based on repeating the photograph and measurement procedure several times. The previously described lens distortion was applied and, based on these pixel locations, the depth of each pixel was determined using Equation 27. The x and y locations were determined via triangulation. Finally, a coordinate transformation was performed to correct for the slight vertical misalignment of the cameras.

The resulting calculated locations of these points are shown in FIG. 21. The locations of these lighted pixels were also determined using the method described above based on the known locations of the pixels on the OLED screen; these stereoscopic measurements are in purple. These are also shown along with the calculated stereoscopic data in red in FIG. 21.

There were three primary factors in the uncertainty in the experimental measurement. The first was due to the uncertainty in the pixel location of every measured point in the image. Based on repeated measurements, this was done with a precision of +/−1 pixel. The resulting error in depth associated with a one-pixel deviation was 2 mm. The second major source of error in the measurements was due to measurement of the location of the aperture of the camera with respect to the center of the hemisphere. This error contributed an additional error of +/−1 mm. Finally, there was error associated with the physical location of the lighted pixels on the OLED screen. The error in determining the exact position of the physical pixels resulted in an additional uncertainty in the measurement of +/−2 mm. The total estimated error in the data was determined by adding these three errors in quadrature, and was equal to +/−3 mm.

The chi-square statistic between the experimentally measured virtual image point locations and the numerically calculated image point locations based on this estimated error was 227 for the 238 data points, with a corresponding p-value of 0.83. This indicates the results of the display-control method described above are consistent with the experimental measurements on actual imaging.

There was described above a method that can be used to determine the virtual surface of an object viewed from a mirrored surface. This method relies on recognizing the most significant, consistent depth cues used by the viewer, and then calculating the result for these cues based on numerical ray-tracing or alternative techniques such as the semi-analytical ray-tracing technique described above.

This method for determining a virtual image surface was designed to be practical and convenient for designing an object screen or mirrored surface to create a desired virtual surface for a human observer at a known location. The method can be used to determine the location of an object displayed on a display screen that, when viewed reflecting on a curved mirror, produces a virtual image that provides a parallax and/or stereoscopic cues. The method can also be used to determine the shape of the curved mirror and/or the shape of the display screen ensuring that, when an object is viewed reflecting on a curved mirror, produces a virtual image of the object that provides a parallax and/or stereoscopic cues.

This method can be extended to work with mirror shapes other than just hemispheres, as well as with lenses (or curved refracting surfaces) that cannot be accurately modeled using conventional techniques. Therefore, even though the techniques and equations developed above are to be used in reflection, a similar set of equations and techniques can be developed for refraction to account for parallax or stereoscopic cues when an image is viewed through a lens. Either the lens, the location of the object or the shape of the display screen on which the object is displayed can be determined to ensure the image viewed by the user (e.g., virtual image for a divergent lens) is produced to provide parallax or stereoscopic cues.

The method described above is used to control the location of a projected image portion by a projector which projects onto a display screen which generates a specific virtual image when the display screen is viewed reflecting from a mirror.

The display screen can be a display device such as a LCD screen (or any other type of TV screen or monitor, which illuminates thereby displaying an image), or a display screen such as a rear projection screen, a front projection screen (which receive an image projected from elsewhere to have this image displayed thereon) or any other display screen suitable to be viewed reflecting from a curved mirror. The display screen forms the displaying object, since it will be imaged by a mirror or another optical element to form the virtual image that will be viewed by the observer. The displaying object is controllable since the image generated thereon or projected thereonto can be controlled by a computing system to eventually correct the mapping of the image thereon to take into account parallax or stereoscopic cues for greater realism.

Figure 26:
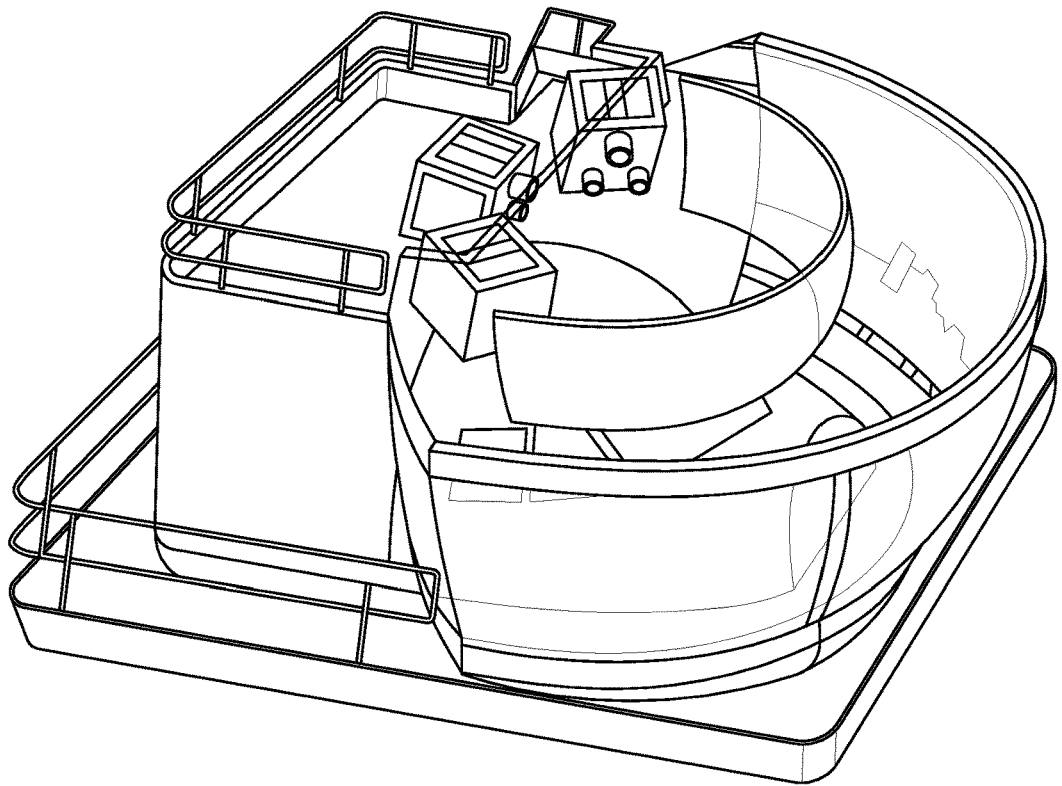

For example, as shown in FIGS. 26-27, a state-of-the-art flight simulator is shown. The cockpit is physically close to the pilot trainee. The cross-cockpit is the virtual image, reflected by the collimating mirror, of an image produced on a projection screen by projects. The virtual image is located at infinity.

Figure 29:
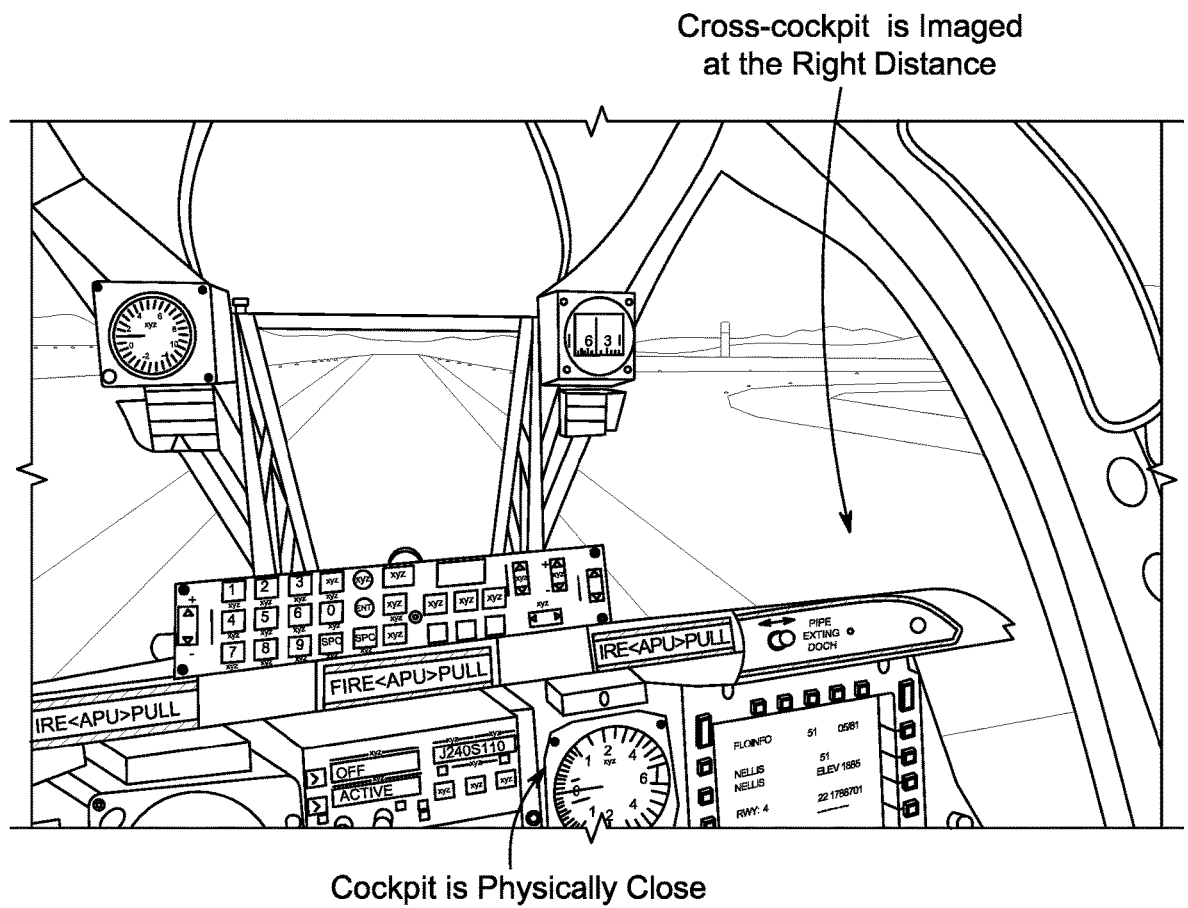
FIG. 29 is a picture illustrating image display in a simulator, according to an embodiment.
Figure 30:
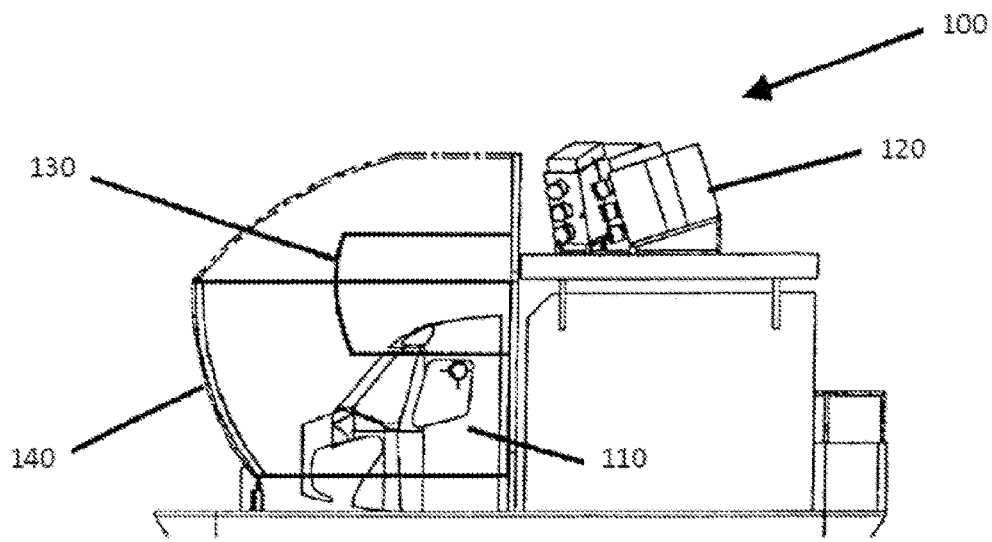
FIG. 30 is a side view illustrating a flight simulator, according to an embodiment.

A flight simulator 100 for implementing the method is shown in FIG. 30. The pilot trainee is installed in the cockpit 110 and views the virtual images as reflected by the mirror 140 from the object, which is the projection screen 130. The object is created by having the projectors 120 illuminating the projection screen 130. By using the method described above, the following steps can be performed by having a computer system perform the following tasks to enhance realism, notably in depth perception:

1) Determining the location of the observer that will be viewing the virtual image and the direction the observer is facing (in order to determine the interocular vector $\hat{E}$,);
2) Determining the shape and location of the mirror in space (this shape is already known);
3) Defining the desired virtual image/surface, and consequently the perceived image distance from the observer to the desired surface based on horizontal parallax or binocular depth cues.
4) Determining the object distance from the mirror to the projection screen or display that will achieve this desired virtual image.
5) Making the projection screen shaped to achieve these object distances from the mirror to the projection screen
6) Controlling the image projected by the projectors 120 to get the targeted projected image on the projection screen 130.
7) Optionally, repeating above procedure while creating a mirrored surface that achieves the desired object distances from mirror to screen The result for the pilot, as shown in FIG. 29, is that the cross-cockpit image is now imaged at a finite distance that is more realistic than an image substantially imaged at infinity.

The technique can be applied to other technological contexts, such as anamorphic art, panoramic imaging tools, or Pepper's Ghost-based displays. The image can thus be static (i.e., not dynamic). Furthermore, the projector/projection screen tandem can be replaced by a monitor/partial mirror tandem to obtain the same effect.

The method of control must be performed by a computing system to which all necessary parameters are inputted. The computing system can automatically, and in real time if needed, control the way an image is projected or displayed to form an object that will be transformed to a virtual image by a mirror. This control may involve, for example, transforming the pixel location of pixels of an image to be displayed using Eq. 15. This would allow the eventual virtual image produced by the mirror to respect the cues mentioned above for greater realism when the virtual image is viewed by an observer. For instance, not rendering objects much closer than the virtual image or much further away from the virtual image maximizes realism. This also allows the viewer to perceive greater realism even if they are away from the axis of symmetry of the mirror or lens, such as more than 5°, or more than 10°, or more than 15° away from this axis, where prior art methods would fail to provide a realistic immersion.

The method is shown in FIG. 31, where step 1910 relates to providing the mirror and display screen, which oppose each other. Step 1920 relates to the determination of the location of the observer, who can be close to the mirror, and away from its axis of symmetry (considering the mirror or lens at which the observer is looking has an axis of symmetry). Step 1930 relates to the determination of the virtual image that should be viewed by the observer at such a location. The shape of the mirror (or lens) or of the displaying object (projection screen or other) can be determined to aid in achieving the greater sense of realism in depth perception by parallax or stereoscopic cues. At step 1940, the mapping of the original image on the display object (by projection or illumination) can also be controlled to provide the greater sense of realism in depth perception by parallax or stereoscopic cues, e.g., using equation 15.

The method described above can provide much larger convergence and/or divergence tolerances for a collimated display. Regarding convergence and divergence, when an observer looks at an object, they direct their two eyes towards it. The angle between the direction vectors of their two eyes is known as the convergence angle. When their two eyes are directed away from one another, the angle between them is the divergence angle. When the angle is divergent, the situation is painful for the brain, and this situation is rarely encountered unless the observer looks at a curved mirror. When looking at something close to the observer, the convergence angle between the eyes is large, and when looking at an object very far away, the convergence angle is almost zero.

Now referring to FIGS. 1-9, there is shown an immersive work station 200 which, among other things, uses a designed virtual surface 240 to create an immersive display. A work station is an environment in which a user can view content, and possibly interact with it. The display comprises a curved, mirrored surface 240 and a display screen 230 together designed to create an immersive display system using collimated or nearly-collimated light, which is projected taking into account depth cues that must be provided in the final virtual image. The projector 220 is thus controlled according to a method described further below to create virtual images having a more realistic depth when viewed by the user in the immersive station comprising the immersive display. A structure or frame can be used to hold the mirrored surface 240 in place, and optionally serve as a support to hold speakers of the sound systems which are physically located around the user of the work station to provide immersive audio contents consistent with the immersive image rendering of the display.

Current collimated displays can create very realistic representations of reality for scenarios where objects are typically seen far from the observer (such as in flight simulator displays). These conventional display systems place display screens at the point where light reflected or emitted from these screens create collimated light once reflecting from spherical mirrors. This is done in order to maximize the depth of the observed image, i.e., to produce the virtual image at a high distance (the "infinity"), usually greater than 60 ft. These displays are referred to as collimated displays, because the light reflected from the projection screen is nearly collimated after it reflects from the mirror's surface.

The immersive display described herein places the display screen closer to the mirror than these systems, at a location sufficiently close to the mirror to present an image to the viewer at closer distances (i.e., the virtual image is produced at a finite and realistic distance, close to the mirror), more representative of typical every-day viewing. This configuration makes it possible to achieve an immersive display for applications where objects need to be shown closer to the observer than in conventional flight simulator displays, and enhance perceived realism in this context.

Indeed, conventional collimated displays are extremely effective at achieving immersion when the images displayed are meant to be far from the observer (they are used in flight simulator displays). These conventional collimated displays are not suited for showing objects near the observer, but immersion can be still be achieved for these cases by using collimated or nearly-collimated light.

Another major advantage to this configuration of collimated display, where the display screen is located, with respect to the mirror, closer than the distance that would produce collimated light when reflecting from the mirror, is an increase in the area the observer can view the image with acceptable quality. This area is often referred to as the eyebox of the display. These collimated displays have the added benefit of having two or more times the eyebox size of conventional collimated displays.

Normally, in the context of a conventional collimated display, if a display screen is moved away from the focal point of mirrors, the resulting image will appear distorted, with an odd depth profile to the viewed image. In order to fix this problem that would have occurred by modifying conventional collimated displays, the screen mirror needs to be redesigned from a spherical shape to a non-spherical shape. This requires tools for designing this shape that should be based on the method described further below.

The display system comprises the components needed to create an optimal sense of immersion by the user for a given application, thanks to a large field-of-view display greater than 30° in at least one direction (horizontal and/or vertical) provided by a display object located close to the mirror, and to the collimated display system designed to optimize sense of depth using algorithms of virtual image creation described further below.

A display object too close to the mirror provides a virtual image with poor depth sensation, complicates the optics, and degrades the image quality. A display object too far from the mirror produces a virtual image that looks wrong: images seem to be very large and a long way off from viewer when rendering close objects that should have a close virtual image.

Figure 10:
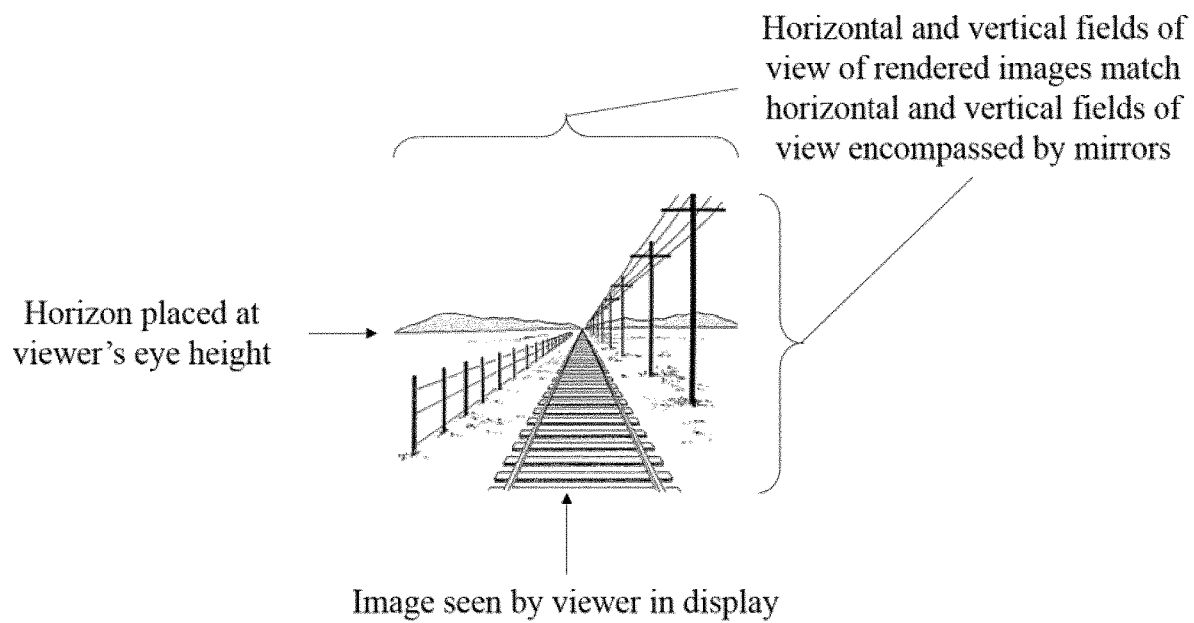
FIG. 10 is a drawing illustrating an image viewed by a user of an immersive work station, according to an embodiment.

The image should be rendered to maximize immersion. By providing the display screen with respect to the screen mirror at a distance closer than in conventional collimated displays and by controlling the projection on the display screen and by providing a given shape to the screen or to the mirror as determined by the equations presented further below, the image displayed to the viewer is presented with the correct perspective. In other words, the perspective of the rendered image matches the perspective one would see while looking out windows of the same size as the mirrors and at the same location. This maximizes the realism of the displayed image, as shown in FIG. 10. This is because nearby objects are correctly imaged in a finite-distance virtual image.

Figure 11:
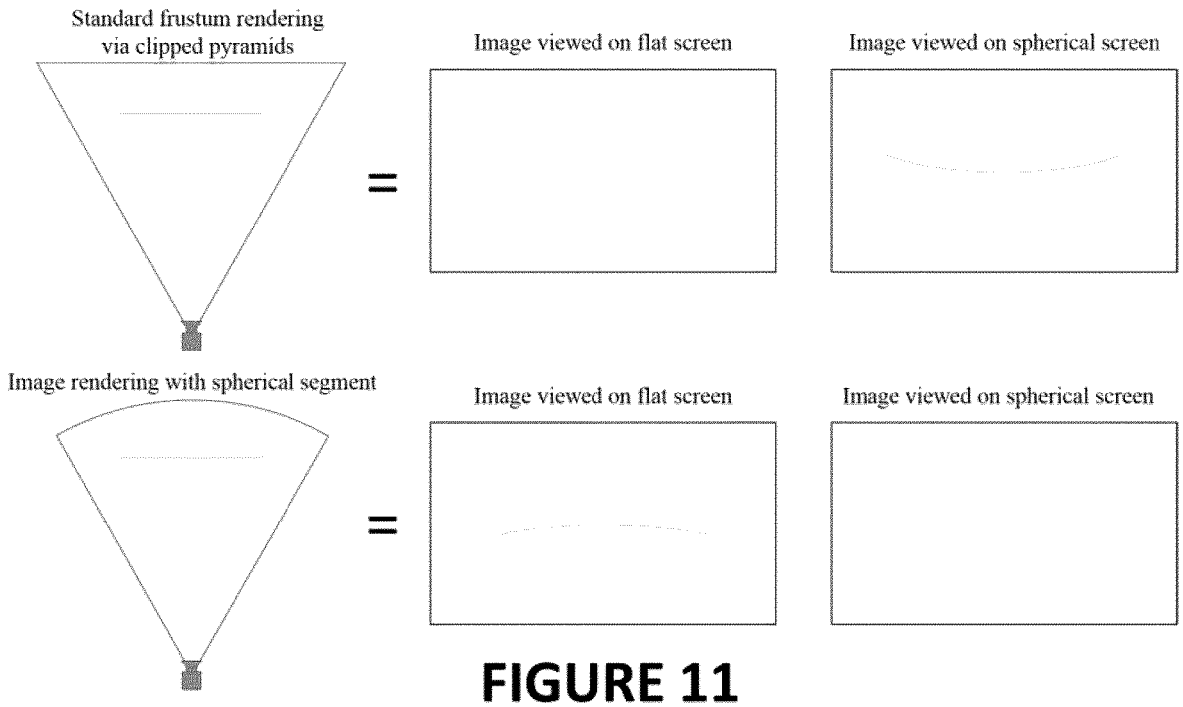
FIGS. 11-12 are drawing illustrating an image viewed by a user of an immersive work station, according to an embodiment.

There should be applied a frustum correction to convert the commonly used clipped pyramid in computer graphics rendering (the viewing frustum) to a curved segment adapted to the shape of the screen mirror (i.e., the virtual surface). This is shown in FIG. 11. Alternatively, spherical rendering or other software techniques to render images with the correct perspective can be performed.

Figure 12:
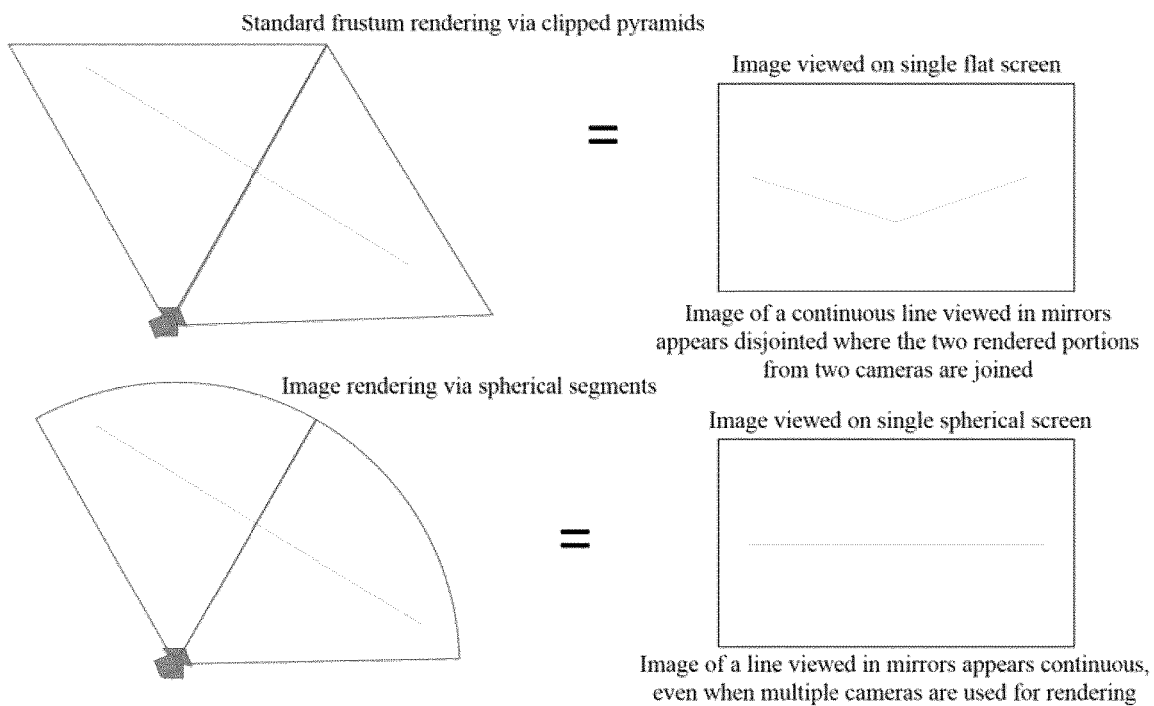

A frustum correction is useful to render the correct perspective for images displayed in the immersive environment. It is also useful for joining the images on the display screen. Since many projectors are used to project onto the display screens, the frustum correction ensures continuity between the images produced by many projectors. The advantage of the correction on the final image is shown in FIG. 12.

According to an embodiment, there is provided in addition to the display system a three-dimensional (3D) sound system, comprising speakers, headphones, or other sound system generating sound anchored to a specific location in 3D world around the user.

Sound is tethered to locations in the digital world, and played with a volume, quality, and possibly in a directional manner that complements the rendered image by mimicking real-life sound cues consistently with the images being viewed in the immersive displays.

According to an embodiment, there is provided a system for user interaction with the digital environment in which the user is immersed. The user interaction system should allow manipulation of digital content and navigation through the content presented on the screen. For example, voice commands (using a microphone) can be implemented. A control board in front of the user, with buttons and/or touch commands, can be provided. A movement tracking system, comprising cameras or infrared detectors, can be used to track body parts of the user intended to have a meaning according to predetermined rules within the work station. Browsing through the digital content and performing manipulations should be intuitive. Pointing to a specific element in the displayed digital content with a finger, as detected by cameras or infrared detectors, to select a given element in the content presented to the user is an example of an intuitive operation performed on the content. Alternatively, simulators that mimic vehicles, machinery, or tools can be used to control the display. Tools and other peripherals such as omni-directional treadmills can also be used to facilitate intuitive user movement. Accessories such as guns or tools can also be tracked and used to control the environment.

As mentioned above, imaging an object at infinity, as performed in collimated displays, is not always desirable, as the simulation may include objects that would normally be close to the viewer. The image therefore does not appear realistically. Furthermore, the slight angular difference of a virtual image between both eyes of a viewer serves as a cue interpreted by the viewer to determine the distance of what is being seen, hence the stereoscopic depth cue that should be present but is not in prior art methods. The lack of this cue can be confusing and does not provide adequate realism.

The method described above can provide much larger convergence and/or divergence tolerances for a collimated display. Regarding convergence and divergence, when an observer looks at an object, they direct their two eyes towards it. The angle between the direction vectors of their two eyes is known as the convergence angle. When their two eyes are directed away from one another, the angle between them is the divergence angle. When the angle is divergent, the situation is painful for the brain, and this situation is rarely encountered unless the observer looks at a curved mirror. When looking at something close to the observer, the convergence angle between the eyes is large, and when looking at an object very far away, the convergence angle is almost zero.

For collimated displays used in flight simulators, the convergence angle is close to zero because the virtual surface is at a long distance in front of the observer. If the observer moves away from the designed eye point, however, the image can distort, and so the user will either have to converge their eyes more to see the image clearly or, more commonly, need to diverge their eyes to see an image, which makes the display very painful to look at. This can happen when an observer moves as little as 20 cm from the eye point. If the virtual surface of a collimated display is brought closer, however, the convergence angle is much higher at the eye point. If the observer moves 20 cm from the eye point in this case, the convergence angle will drop, but will not result in divergence.

This results in a much larger area in which the observer can comfortably view the display. It is advantageous not only for observer comfort but also to allow more people to view the display at the same time. The method described above ensures that the virtual image provides a parallax and/or stereoscopic depth cues, may allow for locating the curved mirror closer to the user and thus improves the tolerance on convergence/divergence experienced by the binocular observer moving horizontally.

This is shown in FIG. 32, which comprises step 2010 where calculations required for an eventual control are performed as discussed above. At step 2020, the mirror is placed opposing the display object screen at a distance smaller than the distance that would produce collimated light when reflecting from the mirror. At step 2030, the display object is being used for display while providing parallax and/or stereoscopic depth cue.

Embodiments of a work station 200 are shown in FIGS. 1-9. The display screen 230 and/or the mirror(s) 240 have shapes defined by the equations above. The projectors are controlled by a program performed by the computer system to project an intermediate image on the display screens 230 which in turn are the object forming the virtual image when reflected by the mirror(s) 240. The distance between the display screens 230 and the mirror(s) 240 is substantially smaller than the distance that would produce completely collimated light. This allows for a virtual image produced at a finite location when viewed by the user of the work station 200. By placing the display screens 230 closer to the mirror(s) 240, the whole system is advantageously rather compact, as shown in the figures. Providing the curved mirrored surface and the display screen at said small distance, if the virtual surface is at a distance that is less than 60 ft or 18.288 m, provides a vergence angle between the eyes of the observer greater than 0.2° when the observer views the virtual image.

A table or control board 270 can be provided in front of the user. Other elements, such as a sound system or control commands as discussed above, can be provided. The overall result is an environment in which objects that should be close to the user in the environment appear effectively closer, with a right sense of depth thanks to the depth cues provided by the shape and location of the mirror(s) 240, the shape and location of the display screen(s) 230, or the shape of the images projected by the projectors 220 on the display screens taking into account the depth cues.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for producing a virtual image focused for both eyes of an observer, the virtual image located closer than 60 feet (ft) to the observer, the method executable by:
   a display screen displaying an original image,
   a computer system controlling the original image on the display screen, and
   a curved mirror having a curved mirrored surface opposing the display screen, the curved mirror configured to produce the virtual image of the original image;
   the method comprising:
   determining, by the computer system, a desired position of the virtual image, wherein the determining is:
      based on a location of the observer with respect to the curved mirrored surface, the virtual image being located at an angle greater than 5 degrees(°) from the axis of symmetry of the curved mirrored surface, and
      based on at least one of a parallax depth cue and a stereoscopic depth cue for the observer at the location of the observer, the at least one of the parallax depth cue and the stereoscopic depth cue being determined by taking into account that a production of the virtual image focused for both eyes of the observer is dependent on an angle from an axis of symmetry of the curved mirrored surface for the angle from an axis of symmetry greater than 5°;
   determining, by the computer system, a location of the original image on the display screen based on the desired position of the virtual image produced by the mirror and modifying mapping of the original image based on the determined location of the original image on the display screen; and
   rendering of the original image on the display screen at the location of the original image determined based on the desired position of the virtual image to produce the virtual image at the desired position and focused for both eyes of the observer.

2. The method of claim 1, wherein determining, by the computer system, the location of the original image to be displayed on the display screen is further based on a shape of the display screen, a shape of the curved mirrored surface, and a distance $d_o$ between the location of the original image and the curved mirrored surface, the distance $d_o$ being determined along a primary ray traced from the position of the original image on the display screen to the observer via the curved mirrored surface, the distance $d_o$ being determined as:

$$d_o = \frac{d_i R \cos\theta}{R\cos\theta - 2d_i},$$

wherein $\theta$ is an angle between the primary ray and a normal to the curved mirrored surface, $d_i$ is the distance from the curved mirrored surface to the desired position of the virtual image, and R is a radius of a curvature of an osculating circle at the curved mirrored surface.

3. The method of claim 1, wherein determining the desired position of the virtual image comprises determining a plurality of positions across the virtual image, thereby forming a shape of the virtual image.

4. The method of claim 1, wherein determining the desired position of the virtual image comprises determining the at least one of the parallax depth cue and the stereoscopic depth cue for the location of the observer viewing the display screen through the curved mirrored surface at an angle greater than 10° from an axis of symmetry of the curved mirrored surface.

5. The method of claim 1, wherein the display screen is a one of: a rear projection screen and a front projection screen.

6. The method of claim 1, further comprising correcting images displayed on the display screen based on the shape of the display screen, to modify rendering of the original image on the display screen at the location of the original image to provide at least one of parallax and a stereoscopic depth cue for the virtual image for the observer at the location.

\* \* \* \* \*